(12) United States Patent
Kurupati et al.

(10) Patent No.: US 7,058,642 B2
(45) Date of Patent: Jun. 6, 2006

(54) METHOD AND DATA STRUCTURE FOR A LOW MEMORY OVERHEAD DATABASE

(75) Inventors: Sreenath Kurupati, Santa Clara, CA (US); Miguel A. Guerrero, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 10/102,968

(22) Filed: Mar. 20, 2002

(65) Prior Publication Data

US 2003/0182291 A1    Sep. 25, 2003

(51) Int. Cl.
*G06F 17/30* (2006.01)

(52) U.S. Cl. .............................. 707/101; 707/3; 707/4; 707/102; 707/103 R; 707/104.1; 711/216

(58) Field of Classification Search ................ 707/101, 707/102, 103, 104, 2, 100, 3, 4, 200; 711/216; 370/389
See application file for complete search history.

(56) References Cited

U.S. PATENT DOCUMENTS

| | | | |
|---|---|---|---|
| 4,611,272 A | | 9/1986 | Lomet |
| 5,386,413 A | | 1/1995 | McAuley et al. ........... 379/392 |
| 5,446,881 A | | 8/1995 | Mammel, Jr. |
| 5,551,020 A | * | 8/1996 | Flax et al. .................. 707/101 |
| 5,649,143 A | | 7/1997 | Parady ....................... 711/220 |
| 5,687,361 A | | 11/1997 | Sarkar |
| 5,761,667 A | * | 6/1998 | Koeppen .................... 707/101 |
| 5,813,040 A | | 9/1998 | Rathke ....................... 711/156 |
| 5,943,674 A | * | 8/1999 | Schofield .................. 707/104.1 |
| 5,949,696 A | | 9/1999 | Threewitt ..................... 365/49 |
| 5,960,454 A | | 9/1999 | Mandal et al. .............. 711/118 |
| 5,978,795 A | * | 11/1999 | Poutanen et al. .............. 707/3 |
| 5,987,468 A | * | 11/1999 | Singh et al. ................ 707/100 |
| 6,029,225 A | | 2/2000 | McGehearty et al. .......... 711/5 |
| 6,044,369 A | * | 3/2000 | Black ............................ 707/4 |
| 6,067,547 A | * | 5/2000 | Douceur ..................... 707/100 |
| 6,081,522 A | | 6/2000 | Hendel et al. .............. 370/389 |

(Continued)

FOREIGN PATENT DOCUMENTS

WO        WO 99/05586        2/1999

OTHER PUBLICATIONS

Arun Iyengar, "Scalability of Dynamic Storage Allocation Algorithms", IBM Research Divison, 1996 IEEE, pp. 223-232.

*Primary Examiner*—Thuy N. Pardo
(74) *Attorney, Agent, or Firm*—Blakely, Sokoloff, Taylor & Zafman LLP

(57) ABSTRACT

Method and data structure for a low memory overhead database and apparatus for implementing the same. Under one embodiment, the data structure includes an index table for storing a plurality of entries, each of the entries corresponding to one of a plurality of hash values, with each entry including a section pointer to identify a memory address of one of a plurality of sections of a key database and including valid bits to indicate a size of the respective section of the key database. The key database is stores a plurality of data entries, with each data entry including a search key having one of the plurality of hash values, and wherein the data entries are grouped into the plurality of sections, with each section storing data entries with search keys having the same hash value.

50 Claims, 15 Drawing Sheets

U.S. PATENT DOCUMENTS

| | | | |
|---|---|---|---|
| 6,097,724 A | 8/2000 | Kartalopoulos | 370/395 |
| 6,141,344 A | 10/2000 | DeLong | 370/360 |
| 6,181,698 B1 | 1/2001 | Hariguchi | 370/392 |
| 6,185,569 B1* | 2/2001 | East et al. | 707/101 |
| 6,236,658 B1 | 5/2001 | Essbaum et al. | 370/401 |
| 6,292,795 B1* | 9/2001 | Peters et al. | 707/3 |
| 6,307,855 B1 | 10/2001 | Hariguchi | 370/392 |
| 6,311,216 B1 | 10/2001 | Smith et al. | 709/226 |
| 6,331,984 B1 | 12/2001 | Luciani | 370/401 |
| 6,912,645 B1* | 6/2005 | Dorward et al. | 711/216 |
| 2002/0002549 A1* | 1/2002 | Lunteren | 707/2 |
| 2002/0032691 A1* | 3/2002 | Rabii et al. | 707/200 |
| 2002/0129033 A1* | 9/2002 | Hoxie et al. | 707/101 |
| 2003/0018878 A1* | 1/2003 | Dorward et al. | 711/216 |
| 2003/0210689 A1* | 11/2003 | Davis et al. | 370/389 |
| 2004/0148306 A1* | 7/2004 | Moulton et al. | 707/101 |

* cited by examiner

METHOD AND DATA STRUCTURE FOR A LOW MEMORY OVERHEAD DATABASE

FIELD

An embodiment of the invention relates generally to database systems and, more particularly, to a low overhead data structure providing efficient search and data insertion capabilities.

BACKGROUND

In step with the rapid evolution of information technology, modern computer systems are expected to store and exchange ever-increasing amounts of data and, accordingly, the efficient management of data by these systems is of paramount importance. The delay associated with searching a database and/or inserting data thereinto are often times a significant source of latency associated with the transmission of data within a computer network—e.g., the Internet—and a failure to efficiently manage a database may produce a bottleneck in the flow of data across a network. For example, network switches and routers maintain a database of IP (Internet Protocol) addresses, and each IP address may have a corresponding action or rule that is to be applied to any data packet sharing that IP address. By way of example, a rule may comprise a network address translation, a routing decision (e.g., which port to direct a packet), a priority determination, or a filtering function. When a switch or router receives a packet having an IP address, the switch or router may search its IP address database to determine which action is to be taken with respect to that packet.

A database may comprise a series of sequentially stored data entries—e.g., IP addresses—of a given depth. The time necessary to search such a sequential database is generally proportional to the database's depth. For example, if there are 100 entries in a sequential database, a search of the database may require 100 clock cycles. Thus, a sequential database is unsuitable for all but the smallest database applications, as there is a high latency required for these sequential searches.

An alternative solution was to use a set-associative cache. The cache was partitioned into a plurality of sections, each section capable of storing the same fixed number of data entries, and the size of these sections could not be expanded. Thus, storage space within a section could not be guaranteed and, if insertion of a data entry was attempted at a full section, a "collision" of data entries would occur. Such a collision usually resulted in the loss of data, as the newly inserted data entry could displace an existing entry or the new data itself could be lost. Also, the use of a plurality of fixed-sized sections resulted in a significant amount of unutilized memory. In sum, use of a set-associative cache for a database is inefficient and susceptible to data loss. Managing these data losses, as well as the failure to fully utilize available memory, increases the memory overhead associated with a set-associative cache database.

Another solution was to use a content-addressable memory, or CAM. A CAM provides a data structure wherein the entries are stored sequentially, but the CAM includes logic circuitry that enables a parallel search of the sequentially stored data entries. Thus, the use of a CAM overcomes the latency associated with traditional sequential databases and, further, does not suffer from the collision and data loss problems exhibited by set-associative caches. A CAM does, however, have some significant drawbacks. Specifically, CAMs come at a high cost, both monetarily and in terms of the on-chip real estate required for the above-described logic circuitry. Also, CAMs are unsuitable for databases having a large number of entries.

As information technology, as well as computer networking technology, continue to evolve, ever-increasing amounts of data will need to be managed. For example, the next generation of hardware-based network switches and routers will be expected to handle an IP address database having greater than one million entries. Such next-generation networking components, as well as other database systems, will require efficient, low memory overhead database systems that maintain data integrity (e.g., no data collisions) while handling a large number of data entries. Current hardware-based solutions—e.g., sequential databases, set-associative caches, and content-addressable memories, all as described above—will not meet the demands of these next-generation systems.

DETAILED DESCRIPTION

Described herein are embodiments of a low overhead data structure providing efficient data search and insertion capabilities while also exhibiting minimal data collisions, the data structure for use in any database application. Embodiments of a device incorporating such a data structure, as well as methods for performing data searches and insertions, are also described. The embodiments of the data structure, device, and methods disclosed herein are described in the context of a network switch or router that maintains a database of IP addresses. However, it should be understood that the disclosed embodiments are not so limited and, further, that these embodiments are generally applicable to any database application requiring data search and insertion capabilities.

Figure 1:
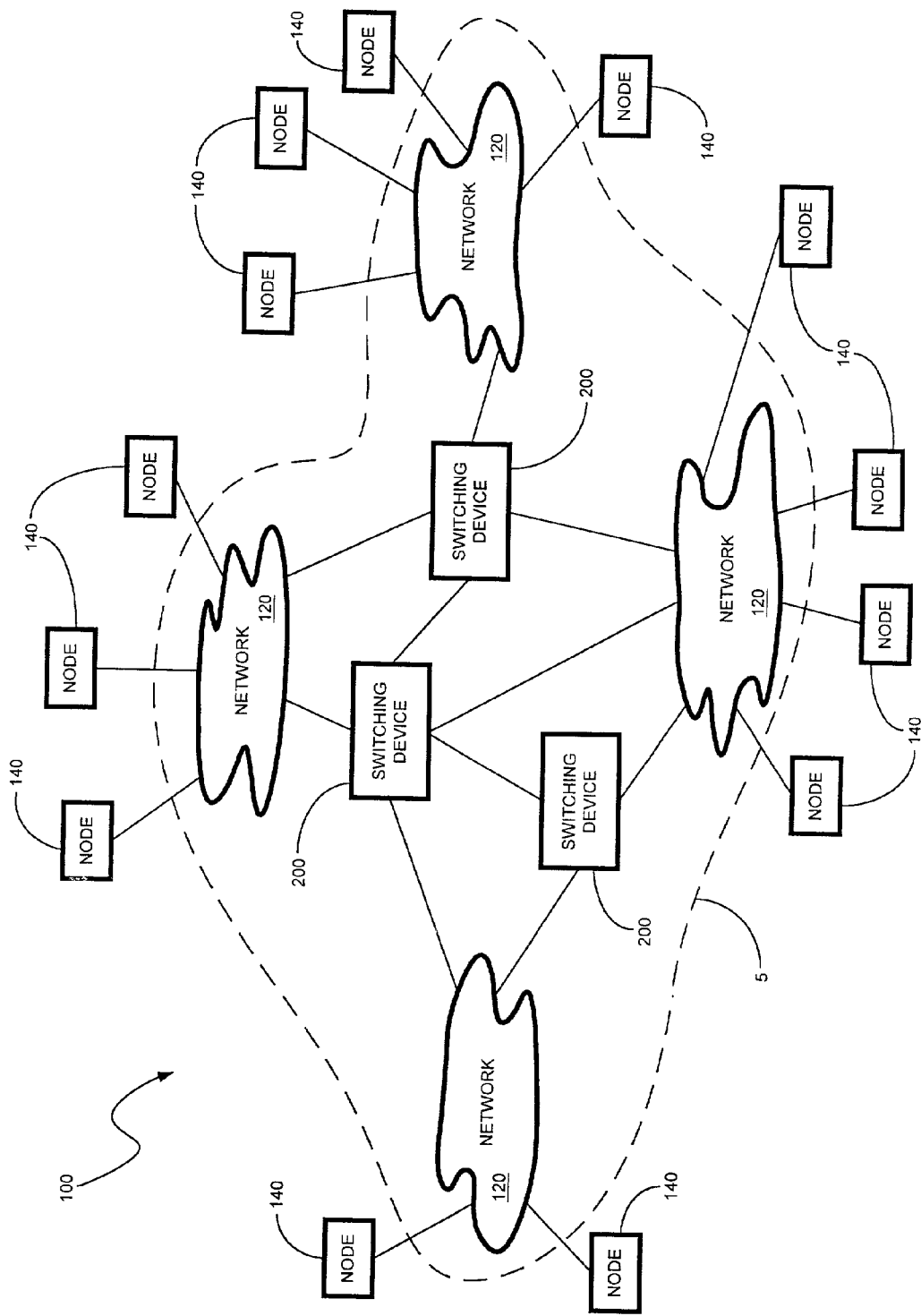
FIG. 1 shows a schematic diagram of an exemplary embodiment of a network apparatus including one or more switching devices incorporating a data structure.

A networking apparatus 100 is shown in FIG. 1. The networking apparatus 100 includes a plurality of networks 120, each network 120 having one or more nodes 140 coupled therewith. A network 120 may comprise a local area network (LAN), a metropolitan area network (MAN), a wide area network (WAN), or other network. A node 140 comprises any addressable device attached to one of the networks 120, such as, for example, a server or other computer system configured (e.g., as by having a network card) to interface with a network 120. The networks 120 may be interconnected, and one or more switching devices 200 (e.g., a packet switch or router) may facilitate data transmission between networks. The collection of interconnected networks 120 and switching devices 200 may comprise the Internet 5 or a portion thereof. It should be understood that the network apparatus 100 may include other components—e.g., repeaters, gateways, hubs, and bridges—which have been omitted for clarity.

Each of the switching devices 200 comprises any suitable device and/or circuitry capable of receiving data (e.g., a packet) and, based upon the contents (e.g., an IP address, a port number, or other address) of that data, forwarding the received data to the appropriate network 120 and/or node 140. Generally, such a switching device 200 will maintain a table or database of IP addresses (or other identifying information, as noted above) for use in making routing decisions, as well as for performing other functions. A rule is typically associated with each IP address, and this rule may be included in the IP address database. The rule associated with an IP address indicates what action—e.g., a routing decision, a network address translation, a priority determination, and/or a filtering function—is to be taken with respect to a packet having that IP address. The IP address database of switching device 200 is implemented using a data structure, as will be described below. For ease of understanding, the data structure will be described in the context of an IP address database; however, it should be understood that disclosed data structure is generally applicable to any type of database, as noted above.

Figure 2:
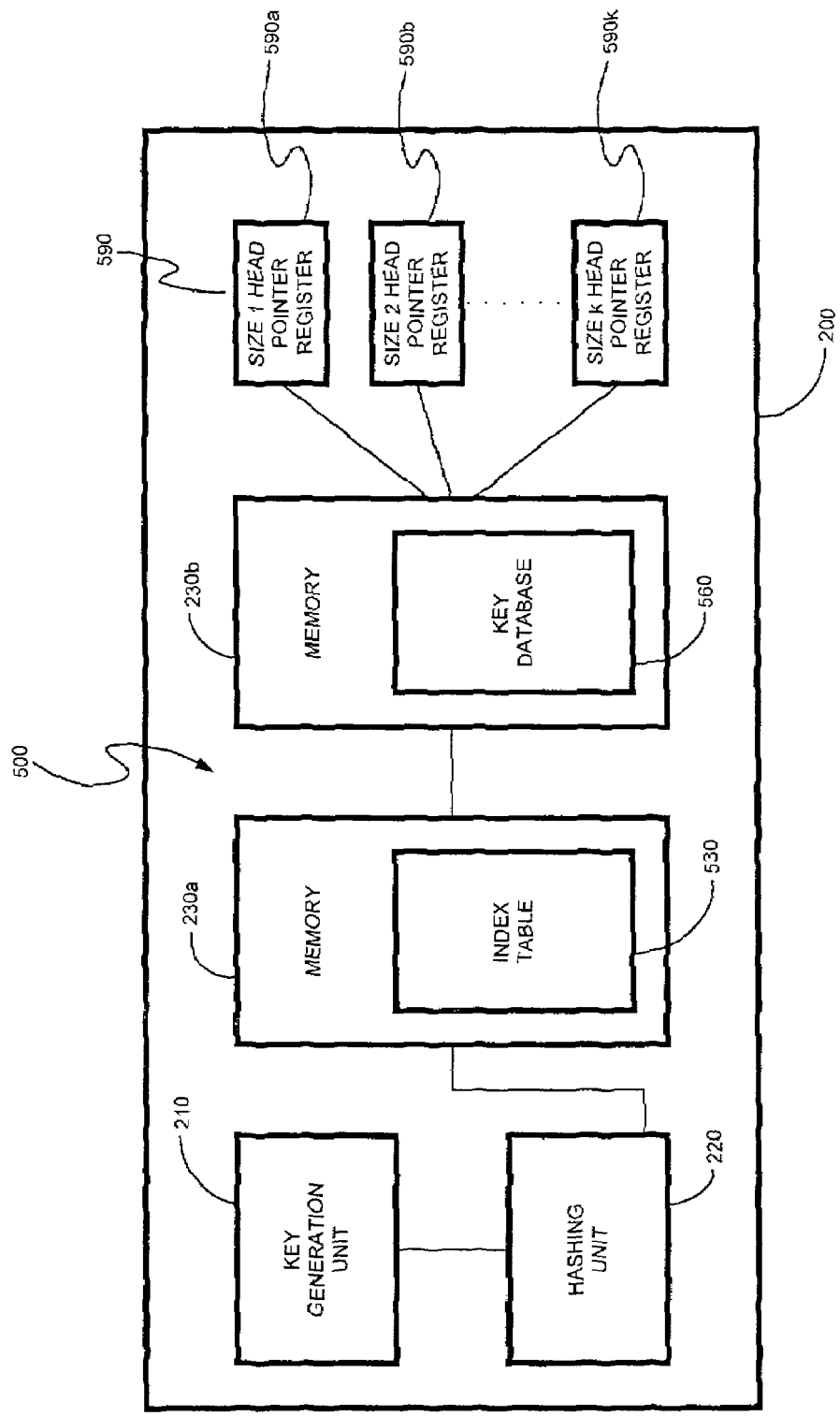
FIG. 2 shows a schematic diagram of one embodiment of the switching device illustrated in FIG. 1.

Referring to FIG. 2, an embodiment of a switching device 200 is illustrated. The switching device 200 includes a key generation unit 210 and a hashing unit 220 coupled therewith. The key generation unit 210 comprises any suitable device and/or circuitry capable of accessing received data and generating a key based upon the received data. For example, the switching device 200 may receive a packet from a network 120. The key generation unit 210 may access that packet to read the source IP address, the destination IP address, the source port number, the destination port number, and the protocol. These pieces of data may then be concatenated end-to-end to form a key, such a key—including the source and destination IP addresses, the source and destination ports, and the protocol—often being referred to as a "5-tuple." In general, however, a key generated by key generation unit 210 may include any part of the data contained within a received packet. As will be explained below, the key is used to search the data structure provided by switching device 200.

The key generation unit 210 provides the generated key—e.g., a 5-tuple—to the hashing unit 220. The hashing unit 220 comprises any suitable device and/or circuitry capable of receiving a key from key generation unit 210 and applying a hash function to that key to create a hash value of a specified number of bits—i.e., an "n-bit" hash value. The hashing unit 220 may utilize any suitable hash function. By way of example, an n-bit hash value may be created by extracting the lower n-bits of the key. Generally, however, the hash function may comprise any suitable combination and/or transformation of bits in the key. The n-bit hash value is used to index into the switching device's data structure, which will be explained in more detail below.

Referring again to FIG. 2, the switching device 200 also includes a data structure 500. The data structure 500 comprises an index table 530 and, in communication therewith, a key database 560, whereas the index table 530 is stored in a first memory 230*a* and the key database 560 is stored in a second memory 230*b*. Coupled with the memory 230*b*—and, hence, in communication with the key database 560—is a plurality of head pointer registers 590, including registers 590*a*, 590*b*, . . . , 590*k*. The data structure 500—the operation of which will be explained in greater detail below—provides for the efficient storage and look-up of IP address or other data entries.

Figure 3:
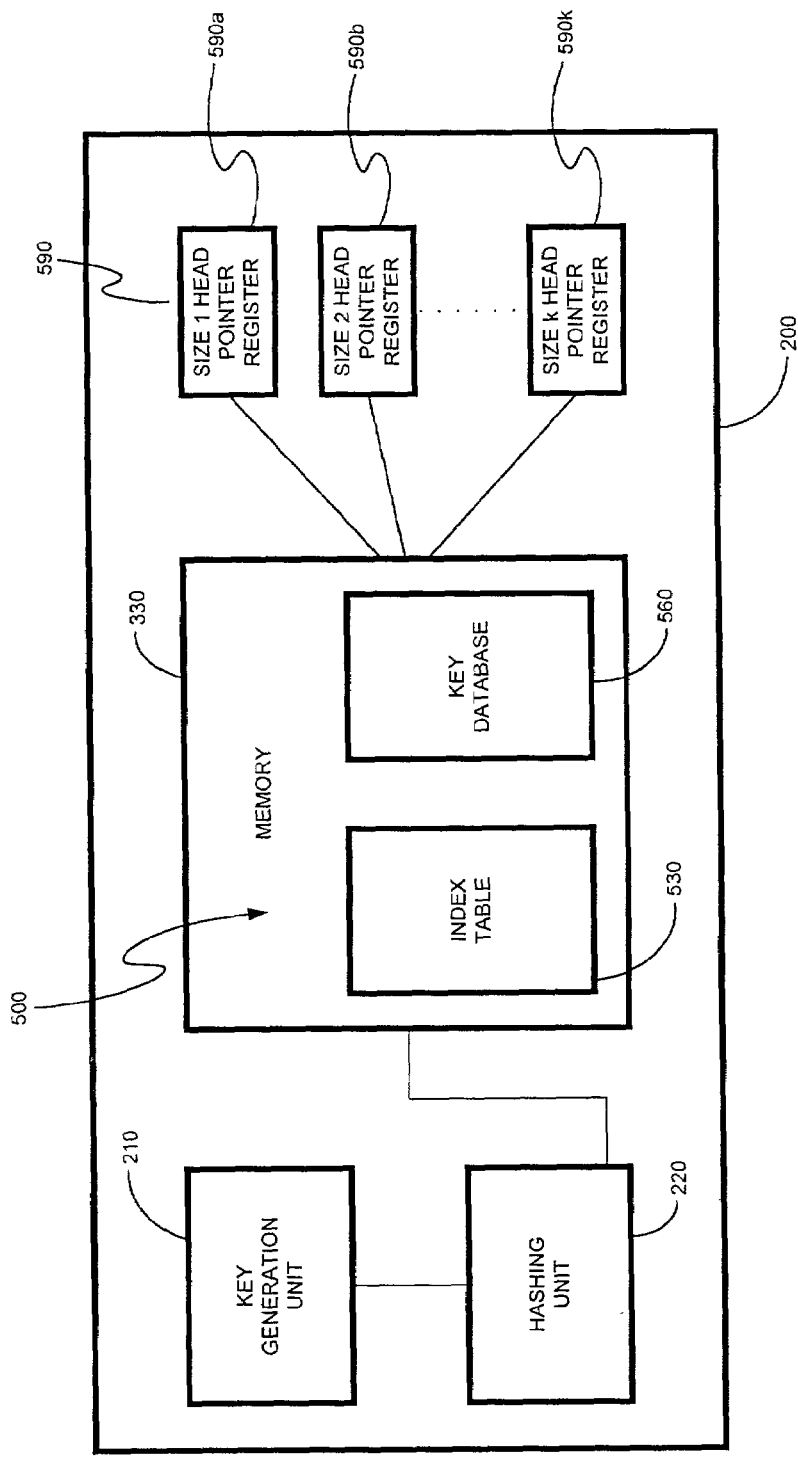
FIG. 3 shows a schematic diagram of another embodiment of the switching device illustrated in FIG. 1.
Figure 4:
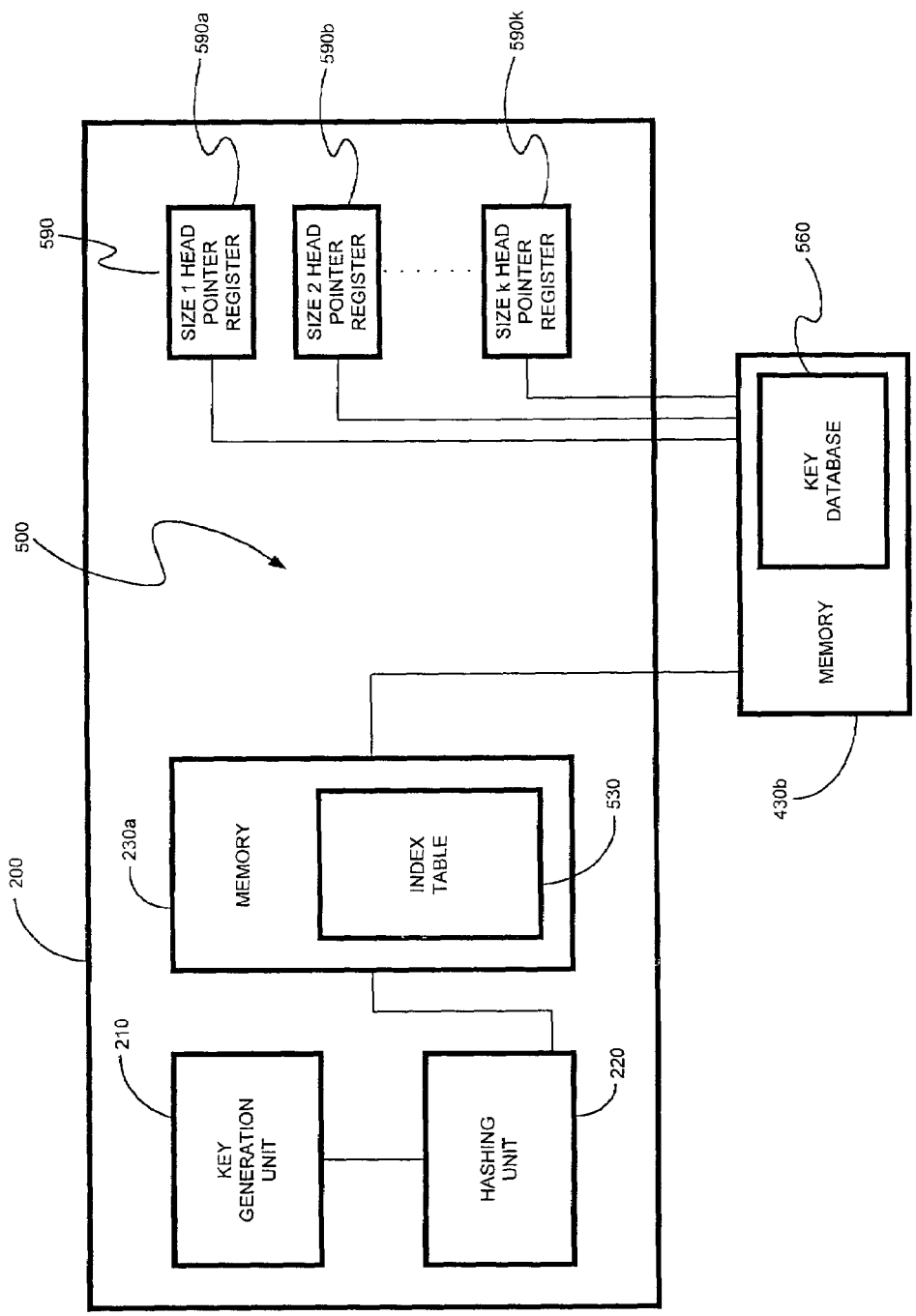
FIG. 4 shows a schematic diagram of a further embodiment of the switching device illustrated in FIG. 1.

As illustrated in FIG. 2, each of the index table 530 and key database 560 is stored in a separate memory 230*a*, 230*b*, respectively. However, it should be understood that the switching device 200 may implement any suitable memory architecture. For example, referring to FIG. 3, the switching device 200 may include a single, integrated memory 330 having resident thereon both the index table 530 and the key database 560. By way of further example, as shown in FIG. 4, the switching device 200 may be coupled with an external memory 430*b*, the external memory 430*b* storing the key database 560. Although not illustrated in the figures, the index table 530 may be stored in an external memory or, in a further embodiment, both of the index table 530 and key database 560 may be located in external memory, whether located in separate external memory or located in a single external memory. The memory 230*a*, 230*b*, 330, 430*b* used for storing each of the index table 530 and key database 560 may comprise random access memory (RAM) or any other suitable memory circuitry and/or devices.

The components—e.g., key generation unit 210, hashing unit 220, memory 230*a*, 230*b* (or 330 or 430*b*), and head pointer registers 290*a*–*k*—of the switching device 200 may comprise separate components that are coupled—e.g., as by wire, circuit board traces, solder joints, and the like—to one another to form a switching device. Alternatively, a switching device 200 may be formed as a single component. For example, each of the key generation unit 210, hashing unit 220, memory 230*a*, 230*b* (or 330 or 430*b*), and head pointer registers 290*a*–*k* may be formed as part of a single integrated circuit (IC) chip. Such an IC chip may, of course, utilize off-chip memory (see FIG. 4). It should be understood that a switching device 200 may include other components in addition to those shown and described in FIGS. 2 through 4, such components having been omitted for ease of understanding. For example, a switching device 200 may include additional memory circuitry and/or logic circuitry, as well as other signal lines and/or buses.

Figure 5:
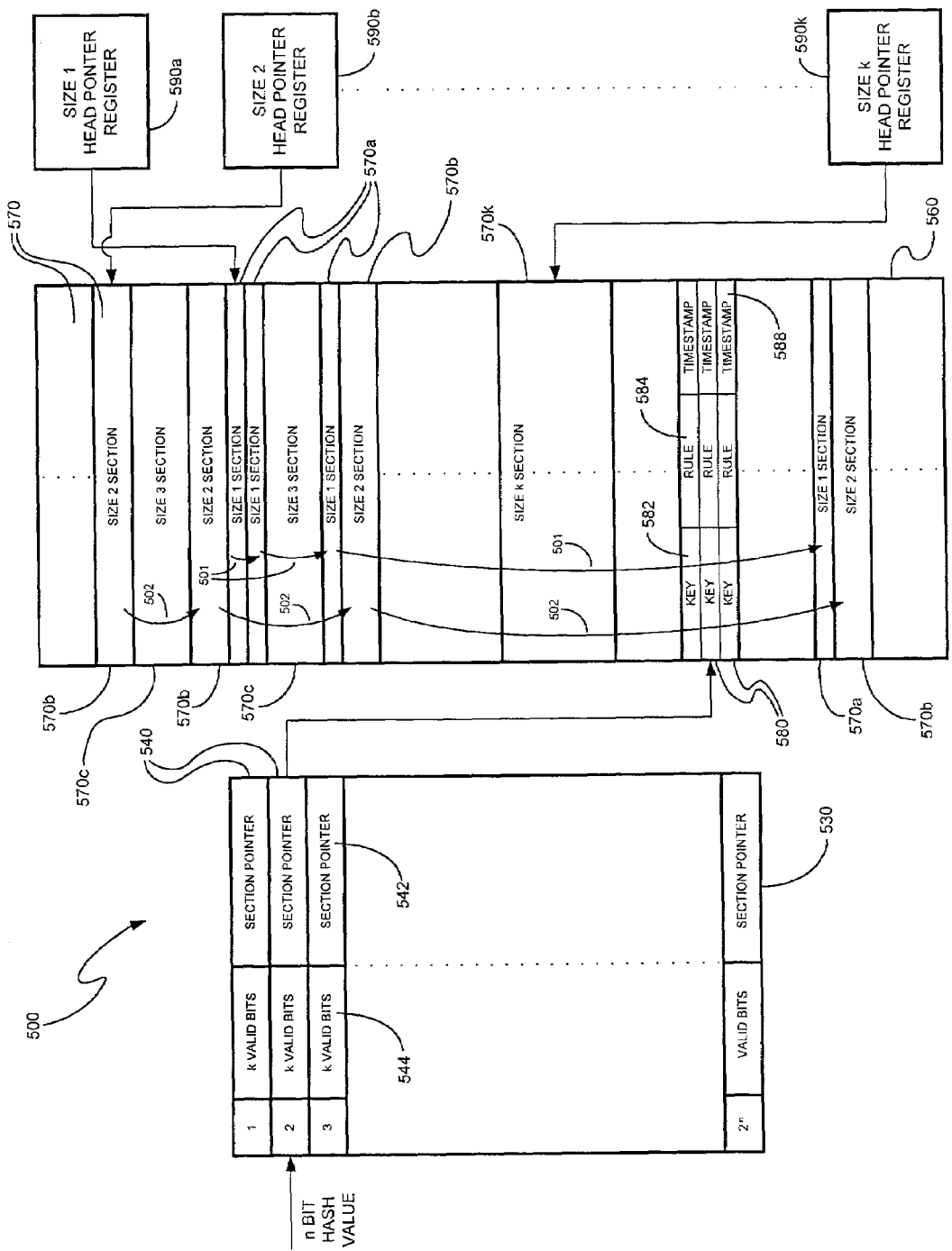
FIG. 5 shows a schematic diagram of an embodiment of the data structure resident in the switching device of FIG. 1.

Referring now to FIG. 5, the data structure 500—including index table 530, key database 560, head pointer registers 590*a*–*k*—is illustrated in greater detail. The index table 530 includes a plurality of entries 540, the number of entries 540 being equal to $2^n$ (to include all possible combinations of the n-bit hash value). Each entry 540 may include a section pointer 542 and a number of valid bits 544. The section pointer 542 of an entry 540 is used to identify a section of the key database 560 that is currently allocated with that entry 540, as will be explained in greater detail below.

The valid bits 544 are used to indicate whether a section in the key database 560 has been allocated to that entry 540 and, further, to indicate the size of the allocated section. The number of valid bits 544 is equal to the number of different sizes of sections in the key database 560. As will be described below, the number of section sizes in key database 560 is designated as the number k; therefore, there are k number of valid bits 544. If one or more of the valid bits 544 of an entry 540 is set high (e.g., a 1-bit), a section in key database 560 has been allocated to that section and, further, the number of valid bits 544 set high provides an indication of the size of the section that has been allocated. It should, of course, be understood that a valid bit (or bits) 544 set low (e.g., a 0-bit) may also be used to indicate allocation of a section.

The key database 560 includes a plurality of sections 570 of varying size, including, for example, one or more size 1 sections 570a (each storing one entry), one or more size 2 sections 570b (each storing two entries), one or more size 3 sections 570c (each storing three entries), and so on. The key database 560 may include any suitable number of section sizes, including up to size k sections 570k (each storing k number of entries). The various sections 570a–k may be stored anywhere in memory and may be dynamically allocated to entries 540 of the index table 530, as the section pointer 542 in each entry 540 of the index table 530 keeps track of the memory locations of any section 570 of key database 560 allocated thereto. Stated another way, the index table 530 continuously tracks memory locations of sections 570 in key database 560, which are not at fixed memory locations.

Each section 570 of key database 560 is capable of storing one or more entries 580—e.g., each size 1 section 570a may store one entry, each size 2 section 570b may store two entries, each size 3 section 570c may store three entries, . . . , each size k section 570k may store k number of entries—wherein each entry 580 may include a key 582 and a rule 584. The key 582 of an entry 580 is a key that has been generated by key generation unit 210 and inserted into the key database 560. The rule 584 contains one or more actions that are to be applied to any packet (or, more generally, to any data) that shares the key 582 in key database 560. For example, a rule 584 may direct the switching device 200 to make a routing decision with respect to a packet, to perform a network address translation with respect to a packet, to determine a priority of data contained in a packet, and/or to determine whether a packet is to be filtered.

In a further embodiment, an entry 580 in a section 570 of key database 560 may also include a timestamp 588. The timestamp 588 of an entry 580 indicates the time at which an entry was first inserted into the key database 560, thereby providing an indication of the "age" of the entry 580. Timestamps 588 may be used to filter out aging entries 580 in key database 560 that are no longer viable (i.e., not recently accessed), as ! well as to perform other functions.

The first "free" section (i.e., devoid of entries 580) of each size of section 570 is identified by a corresponding head pointer register 590. For example, the first free section of the size 1 sections 570a is identified by the size 1 head pointer register 590a. Similarly, the first free section of the size 2 sections 570b is identified by the size 2 head pointer register 590b, and so on. A data entry 580 to be inserted into a section 570 of the key database 560—as well as any existing entries 580 that are associated with the same entry 540 of the index table 530 and that are to be copied into the same section 570, as will be explained below—is inserted into the first free section of the appropriate size section 570 in the key database 560. Thus, each of the head pointer registers 590a–k n tracks the first free section of its associated size, which may change dynamically during operation of the switching device 200, such that an optimum size free section 570 of key database 560 is identifiable and accessible at any point in time.

Initially—i.e., at system power-up, at system boot-up, and/or at system reset—all sections 570 of the key database 560 are free. At this time, the other sections of a given size are linked together with the first free section to form a linked list, as denoted for the size 1 and size 2 sections by the arrows 501, 502, respectively. There is no memory overhead associated with maintaining this linked list because a section's link pointer—i.e., the pointer that identifies the next section 570 in the linked list of that size of section—is only needed when that section 570 is free and, therefore, the link pointer can be stored in the portion of a section where the first entry 580 will be placed. When a first free section 570 is allocated to receive an entry (or entries) 580, the address in the corresponding head pointer register 590 is copied over to the appropriate section pointer 542 in the index table 530 and, likewise, the link pointer in the newly allocated section 570 is copied over to the head pointer register 590, such that the section 570 identified by the link pointer is now identified as the first free section of that size.

It should be understood that, initially (when all sections 570 are free), the section 570 of each size that is labeled the first free section is arbitrary, as any free section of a given size can receive data and, therefore, can be the first free section. Further, the order in which a series of sections 570 of a given size are linked to the first free section of that size is arbitrary, and the sections of a size may be linked in any suitable order. It follows, therefore, that a section 570 of a given size may be located anywhere in memory (e.g., memory 230b, 330, 430b), as noted above. The above-described memory architecture allows for the dynamic allocation of sections 570 within the key database 560, and the sections 570 of key database 560 are allocated on a need basis.

Figure 6:
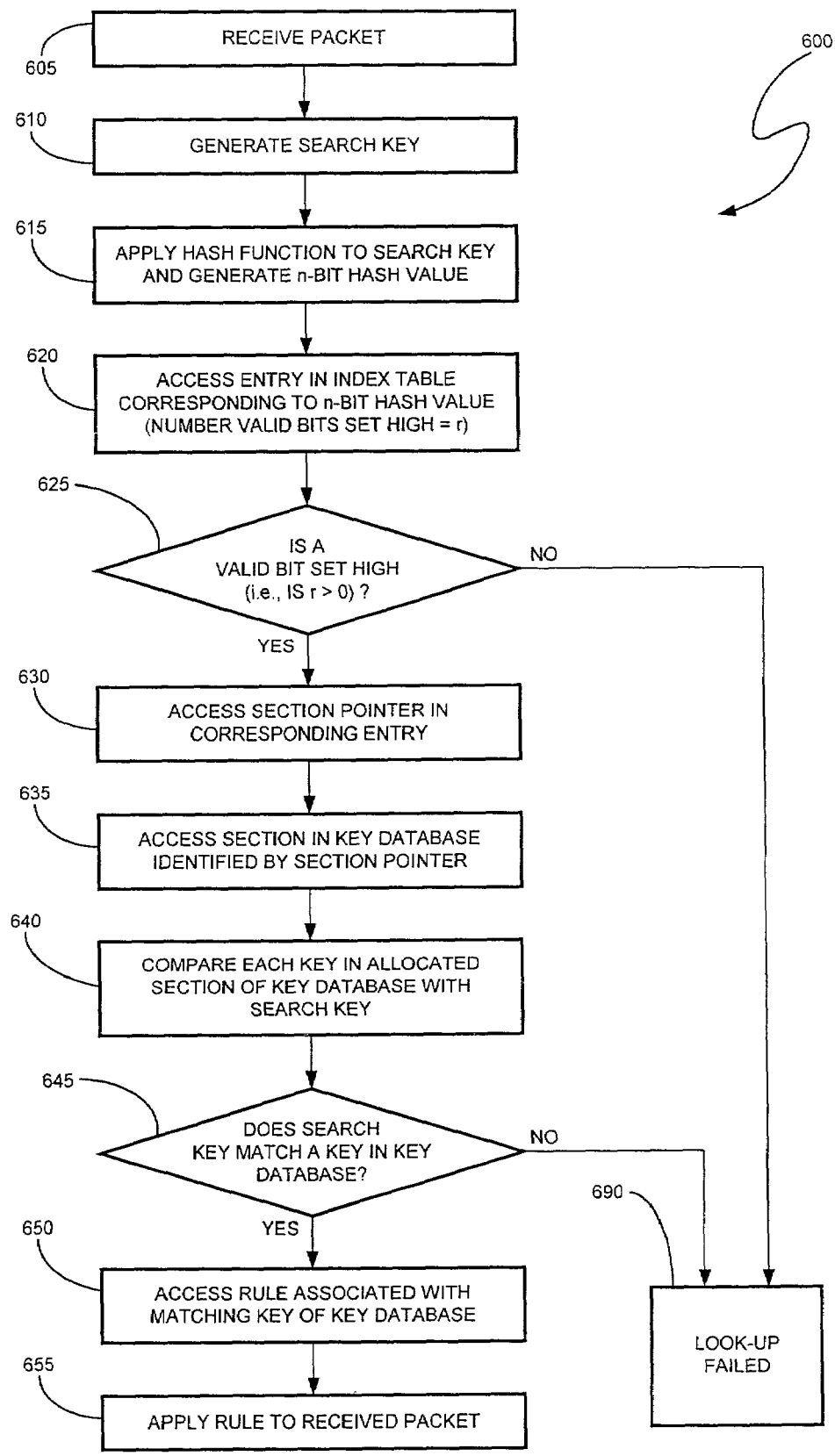
FIG. 6 is a block diagram illustrating a method of performing a look-up in the data structure of FIG. 5.
Figure 7:
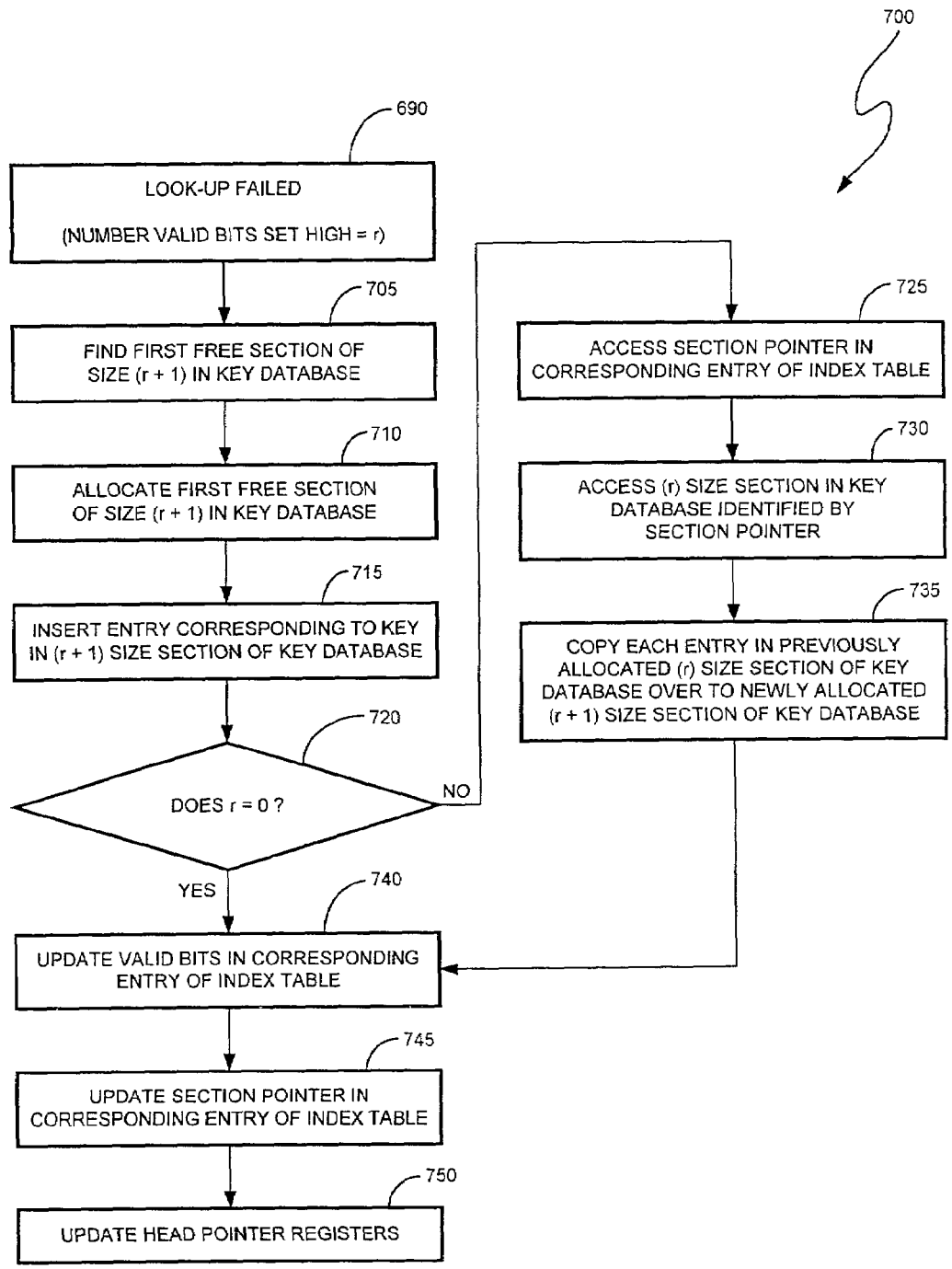
FIG. 7 is a block diagram illustrating a method of inserting a data entry into the data structure of FIG. 5.

Operation of the data structure 500—as well as operation of the switching device 200—can be better understood by reference to the embodiment of a method 600 of performing a data look-up illustrated in FIG. 6, by reference to the embodiment of a method 700 of performing a data insertion illustrated in FIG. 7, and by reference to the example of FIGS. 8A–H, which illustrates both data insertion and data look-up operations.

Referring now to FIG. 6, the block diagram illustrates an embodiment of a method 600 for searching the data structure 500. As shown at block 605, a packet is received at key generation unit 210 and a search key is generated, which is illustrated by block 610. The search key may comprise a 5-tuple or any other suitable part of the data contained in the packet. The search key is then provided to the hashing unit 220 and, referring to block 615, a hash function is applied to the search key to create an n-bit hash value. Again, the n-bit hash value may comprise the lower n-bits of the search key or any other suitable combination and/or transformation of the bits of the search key.

Referring to block 620, the entry 540 in the index table 530 corresponding to the n-bit hash value is accessed. For example, if the n-bit hash value equals the number 43, the $43^{rd}$ entry of the index table 530 is the corresponding entry. The corresponding entry 540 is accessed to determine the number of valid bits 544 that are set high (the number of valid bits set high being denoted by the variable r). A high valid bit or bits 544 (e.g., a 1-bit) will indicate that a section 570 in key database 560 is currently allocated to the indexed entry 540 (e.g., the $43^{rd}$ entry) of the index table 530. Again, as noted above, a low valid bit (e.g., a 0-bit) may also be used to indicate that an allocated section 570 exists. Referring to reference numeral 625, if no valid bit 544 is set high thereby indicating that no section 570 of key database 560 has been allocated to the indexed entry 540 of index table 530—the look-up has failed, as shown at block 690.

Referring again to reference numeral 625, if a valid bit or bits 544 is set high (i.e., r>0), the section pointer 542 in the corresponding entry 540 (e.g., the $43^{rd}$ entry) of index table 530 is accessed, as shown at block 630. The section pointer 542 will identify a section 570 in key database 560 that is currently allocated to the corresponding entry 540 of index table 530, and that allocated section 570 is accessed, as illustrated at block 635. The allocated section 570 of key database 560 will include one or more entries 580. For example, if the allocated section is a size 1 section 570a, that section will include one entry 580. Similarly, if the allocated section is a size 2 section 570b, that section will typically include two entries 580, and so on. Referring to block 640, each entry 580 in the allocated section 570 is then compared with the search key.

Referring to reference numeral 645, if no entry 580 in the allocated section 570 includes a key 582 that matches the search key, the look-up has failed (see block 690). Although the allocated section 570 includes one or more entries 580—each of these entries including a key 582 having an n-bit hash value equal to the n-bit hash value (e.g., 43) of the search key—none of the keys 582 in the allocated section 570 matches the search key. This result is possible because a number of distinctly different keys generated by key generation unit 210 may exhibit the same n-bit hash value. Thus, identity of n-bit hash values does not necessarily denote identity of keys. The n-bit hash value is essentially a tool for indexing into the key database 560, and the storing in a section 570 of all keys 582 sharing the same n-bit hash value enables the data structure 500 to efficiently categorize, store, and subsequently retrieve a key.

Referring again to block 645, if one of the entries 580 includes a key 582 that matches the search key, the look-up succeeded. As illustrated at block 650, the rule 584 associated with the matching key 582 may then be accessed and, as shown at block 655, that rule 584 may be applied to the received packet from which the search key was generated. Again, the rule may, for example, direct that a network address translation be performed, that a routing decision be made, that a priority determination be made, and/or that a filtering decision be made.

Illustrated in the block diagram of FIG. 7 is an embodiment of a method 700 for inserting data—e.g., an entry 580 including a key 582, a rule 584, and, optionally, a timestamp 588—into the data structure 500. The method 700 of inserting a data entry into the data structure 500 is presented in the context of an assumption that a look-up operation has failed, thereby necessitating a data insertion operation. However, it should be understood that a data insertion operation may be performed independent of any look-up operation that has (or has not) failed.

Referring to block 690 in FIG. 7, a look-up operation has failed. Accordingly, a packet has been received, a search key (e.g., a 5-tuple) generated, an n-bit hash value (e.g., the lower n bits of the key) created, and the corresponding entry 540 of index table 530 accessed to determine the number r of valid bits 544 set high (see FIG. 6, blocks 605, 610, 615, 620). Thus, there is one new entry (including a key, rule, and, optionally, at timestamp) to insert into the key database 560. Again, the number r of valid bits 544 set high, if any, indicates the size of the section 570 in key database 560 that has been previously allocated to the corresponding entry 540 of index table 530. If no valid bits 544 are set high—i.e., r equals zero—no section 570 of key database 560 has previously been allocated to the corresponding entry 540. Once again, a valid bit or bits 544 set low (e.g., a 0-bit) may also be utilized to indicate allocation of a section 570 of key database 560.

As noted above, there is one entry—i.e., a key, a corresponding rule, and, optionally, a timestamp—to insert into the key database 560. Thus, as illustrated at block 705, the first free section of a size equal to (r+1) is identified in the key database 560. In other words, a section 570 having a size that is at least one size greater than any previously allocated section 570 of key database 560 is found. The first free section of size (r+1) is identified by the size (r+1) head pointer register 590. By way of example, if no valid bits 544 of the corresponding entry 540 were set high (i.e., r=0), the first free section of size 1 would need to be identified. If, for example, two valid bits 544 were set high (i.e., r=2), the first free section of size 3 would need to be identified.

Once the first free section of a size equal to (r+1), or greater, has been identified, that section 570 of the key database 560 is allocated to the corresponding entry 540 of the index table 530, as shown at block 710. Referring to block 715, an entry 580 is then inserted into the newly allocated section of the key database 560, the entry 580 including a key 582 and a corresponding rule 584. The entry 580 may further include a timestamp 588.

As suggested above, a free section of a size one greater than the previously allocated section, if any, needs to be identified, such that one additional entry may be inserted into the key database 560 and indexed by its n-bit hash value. However, if a section 570 of a size one greater than any previously allocated section is not available, a larger size section 570 may be allocated. Thus, as used herein, the phrases "larger size" and "greater size" each refer to a section that is, to any extent, larger than the size of a previously allocated section. Also, if the previously allocated section is sufficiently large to receive the new entry—i.e., when this section was allocated, an appropriate size section was unavailable and a larger size was utilized—a new section may not need to be allocated.

If the number of valid bits 544 set high is zero (i.e., r=0)—see reference numeral 720—the corresponding entry 540 of the index table 530 did not have a section 570 of the key database 560 previously allocated thereto. Stated another way, no key having an n-bit hash value corresponding to the corresponding entry 540 of the index table 530 has previously been inserted into the key database 560. Accordingly, there are no entries to copy over to the newly allocated section of the key database 560.

Referring again to reference numeral 720, if the number of valid bits 544 set high is, however, non-zero (i.e., r>0), thereby indicating the corresponding entry 540 of index table 530 has a section 570 of key database 560 previously allocated thereto, that allocated section 570 needs to be accessed. Accordingly, the section pointer 542 of the corresponding entry 540 is read—see block 725—and the section 570 of key database 560 identified by the section pointer 542 is accessed, as shown at block 730. This section 570 of the key database 560 was previously allocated to the corresponding entry 540 of the index table 530, and this section 570 generally has a size equal to the number of valid bits 544 set high (i.e., equal to r). Each entry in this size r section is copied over to the newly allocated section of size (r+1), as illustrated at block 735.

After (or in conjunction with) insertion of the new entry 580 (and, if necessary, those entries 580 from any previously allocated section) into the newly allocated section 570 of the key database 560, the valid bits 544 in the corresponding entry 540 of index table 530—i.e., the entry 540 corresponding to the n-bit hash value derived from the generated key, this key forming a part of the new entry 580 inserted into the newly allocated section of the key database 560—are updated, as illustrated at block 740. An additional valid bit 544 will be set high, such that the total number of valid bits 544 set high equals the size of the newly allocated section, this size being equal to (r+1).

As illustrated at block 745, the section pointer 542 in the corresponding entry 540 of index table 530 needs to be updated. Accordingly, the address stored in the head pointer register 590 corresponding to the first free size (r+1) section that has been allocated—i.e., the address of the newly allocated section of size (r+1)—is copied over to the section pointer 542 of the corresponding entry 540. Also, as shown at block 750, the appropriate head pointer registers 590 need to be updated. The newly allocated section included a link pointer identifying the next free identically sized section in the linked list (of size r+1 sections). To update the size (r+1) head pointer register 590, this link pointer is copied over to the size (r+1) head pointer register. Further, if a previously allocated section exists—i.e., a size r section that, after transferring its contents to the newly allocated size (r+1) section, is now free—the size r head pointer register 590 may need to be updated if the previously allocated size r section is now the first free section of size r.

As set forth above, although the method 700 of data insertion was illustrated in the context of following a failed look-up operation, entry of data into the key database 560 may be performed independent of any look-up operation that has (or has not) failed. Thus, it should be noted that, if the method 700 of inserting a data entry into the data structure 500 does not take place subsequent to a failed look-up operation (as described in FIG. 6 and accompanying text), the method 700 shown and described with respect to FIG. 7 may include some additional operations. Specifically, the method 700 may further include generation of a search key based upon data contained in a received packet followed by creation of an n-bit hash value based upon the generated key, as well as the accessing of an entry in the index table corresponding to the n-bit hash value, such that the valid bits contained in this entry may be read (see FIG. 6, blocks 605, 610, 615, 620).

As described with respect to FIGS. 5, 6 and 7, each entry 540 of the index table 530 includes a number k of valid bits 544 equal to the number of different sizes of sections 570 of key database 560. Because the number k of valid bits 544 equals the number of section sizes in key database 560, these valid bits 544 may be used to indicate the size of any section 570 in key database 560 that has been allocated to an entry 540 of index table 530. Knowledge of the size of any previously allocated section of key database 560 is utilized by the data structure 500 to determine the appropriate size of any newly allocated section and, in some instances, to determine whether a new larger-sized section needs to be allocated (again, if an over-sized section 570 of key database 560 was previously allocated to an entry 540 of index table 530, that over-sized section 570 may be able to receive one additional entry and allocation of a new section unnecessary).

It should be understood, however, that a previously allocated section's size may be indicated by any suitable device or method, and multiple valid bits 544 may not be necessary. For example, each section 570 of key database 560 may include a number of status bits to indicate that section's size, these status bits being read when that section 570 is accessed via the section pointer 542 in the corresponding entry 540 of index table 530. Alternatively, when a section 570 of key database 560 is accessed, the number of entries 580, if any, residing in that section may be counted, and the size of the accessed section 570 inferred from the total number of entries 580 stored therein. For either of the above examples, each entry 540 of index table 530 may include only a single valid bit 544, this single valid bit 544 simply indicating whether any section 570 of key database 560, irrespective of size, has been allocated to that entry 540.

It should also be understood that, although described in the context of the switching device 200, the embodiments of the data structure 500, the embodiments of the method 600 for performing a data look-up, and the embodiments of the method 700 for performing a data insertion may be implemented in either hardware or software. Further, the embodiments of the data structure 500 and the embodiments of the methods 600, 700 for performing data look-up and data insertion, respectively, may be implemented in a combination of hardware and software.

The methods shown and described with respect to FIGS. 6 and 7 may be better understood with reference to the specific example illustrated in FIGS. 8A through 8H. The example depicted in FIGS. 8A–H is presented—for clarity and ease of understanding—in the context of a data structure 800 having a minimum number of index table entries and a minimum number of sizes of sections in the key database. However, it should be understood that, in practice, the index table and key database may each be much larger. For example, a 10-bit hash value may be generated by the hashing unit, resulting in an index table having 1024 entries. Similarly, a key database having ten or more different sizes of sections may be utilized.

Figure 8A:
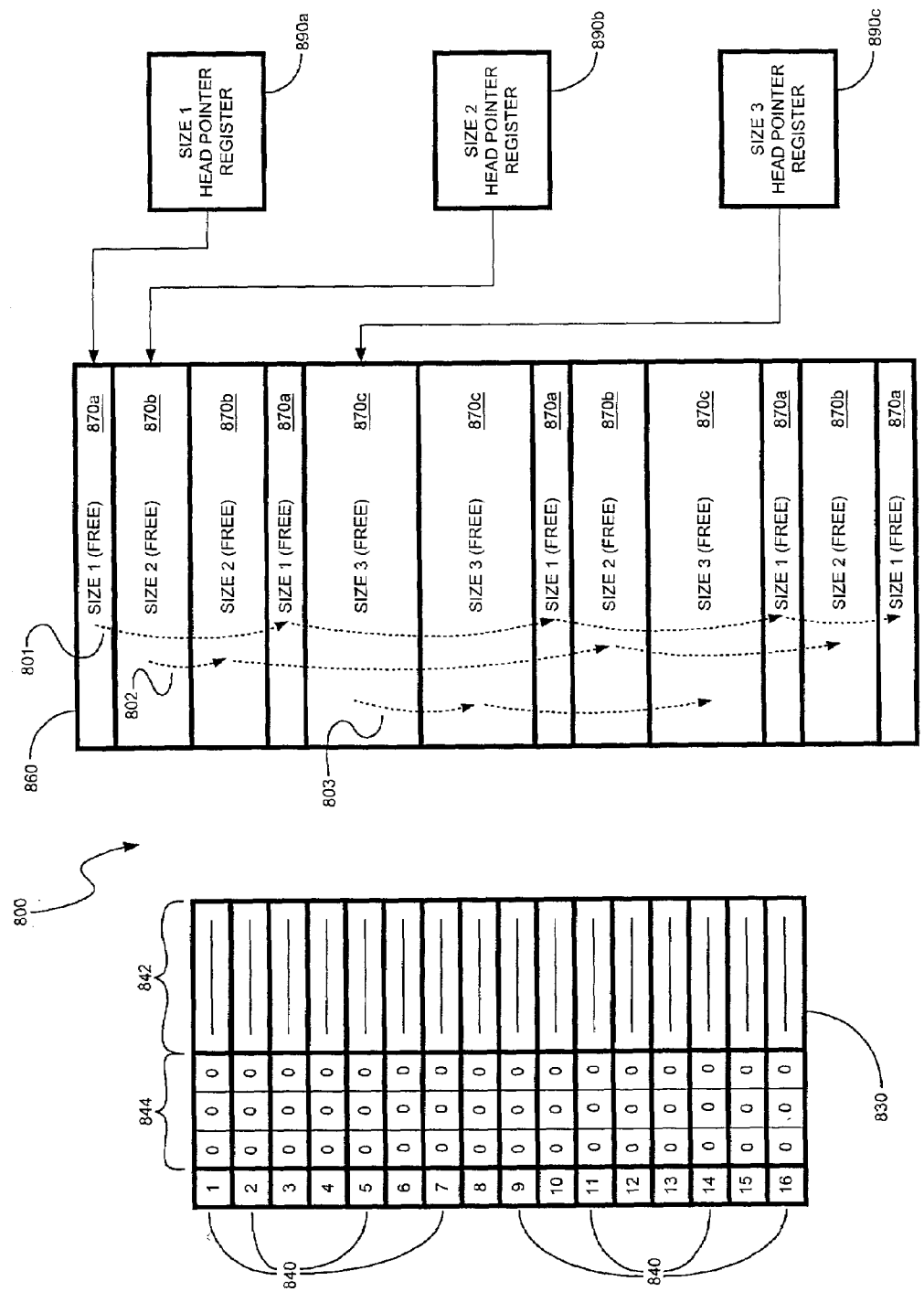
FIGS. 8A–8H show schematic diagrams illustrating exemplary embodiments of the methods of FIGS. 6 and 7.

Referring to FIG. 8A, an index table 830 includes sixteen entries 840, each entry 840 including a section pointer 842 and three valid bits 844. As there is sixteen entries 840, a 4-bit hash value will be used to index into the index table 830. A key database 860 includes three sizes of sections, including size 1 sections 870a, size 2 sections 870b, and size 3 sections 870c. Initially, as shown in FIG. 8A, all of the sections 870a–c of key database 860 are free. Note that the number of sizes of sections—i.e., three—equals the number of valid bits 844 in the index table 830. The first free size 1 section 870a is identified by a size 1 head pointer register 890a. Similarly, the first free size 2 section 870b is identified by a size 2 head pointer register 890b, whereas the first free size 3 section 870c is identified by a size 3 head pointer register 890c. It should be understood that the first free section of each size is arbitrarily selected and, further, that any section of a size could, initially, be labeled the first free section. Also, all size 1 sections 870a are linked together as a linked list (see arrows 801), all size 2 sections 870b are linked together as a linked list (see arrows 802), and all size 3 sections 870c are linked together as a linked list (see arrows 803).

A packet is received and a key (i.e., $KEY_1$) generated based upon the data in the received packet. A hashing function is then applied to the key to create a 4-bit hash value, this four bit hash value numerically equal to seven. Accordingly, the $7^{th}$ entry 840 of the index table 830 is accessed and, because no valid bit 844 in the $7^{th}$ entry is set high, the look-up failed. In other words, the key database 860 does not include any keys having a 4-bit hash value numerically equal to seven and, it follows, does not include a key matching $KEY_1$. Therefore, a data insertion may be performed to insert $KEY_1$ into the key database 860.

Figure 8B:
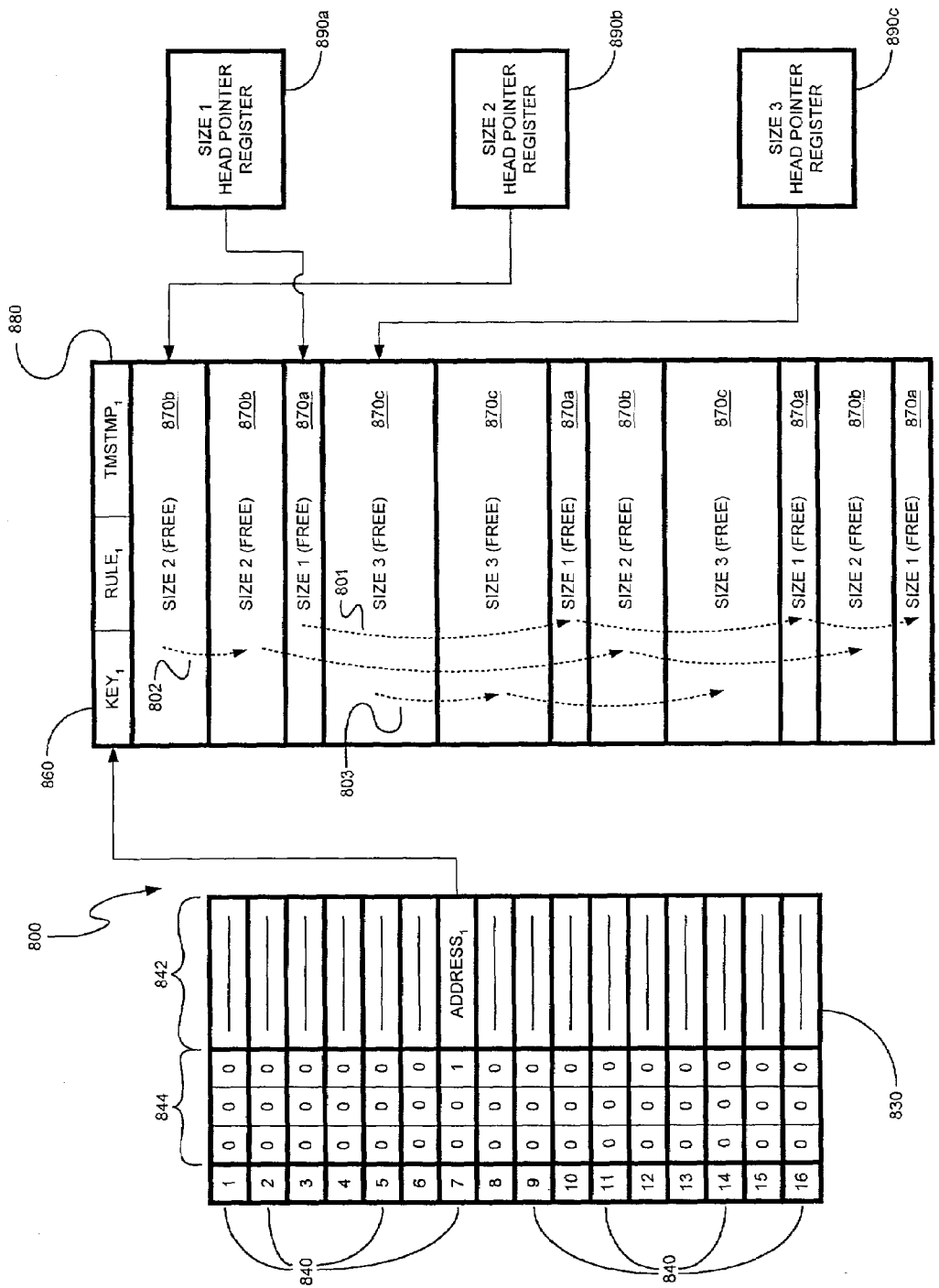

Referring now to FIG. 8B in conjunction with FIG. 8A, the first free size 1 section 870a—as identified by the size 1 head pointer register 890a—is allocated to the $7^{th}$ entry 840 of the index table 830. The address of the first free size 1 section (i.e., $ADDRESS_1$) contained in the size 1 head pointer register 890a is copied over to the section pointer 842 in the $7^{th}$ entry 840 of the index table 830, such that this section pointer now identifies the allocated section 870a. The generated key (i.e., $KEY_1$) and a corresponding rule (i.e., $RULE_1$)—and, optionally, a timestamp (i.e., $TMSTMP_1$)—are inserted into the newly allocated section 870a of the key database 860, thereby creating an entry 880 in the key database 860. Also, one of the valid bits 844 in the $7^{th}$ entry 840 of the index table 830 is set high (e.g., a 1-bit)

to indicate that this entry has a size 1 section 870a of key database 860 allocated thereto.

The size 1 head pointer register 890a is also updated to identify the first free size 1 section 870a (note that, in FIG. 8B, the size 1 head pointer register 890a has dropped down to the next available size 1 section). To update the size 1 head pointer register 890a, the link pointer in the newly allocated size 1 section is copied over to the size 1 head pointer register 890a. Further, the linked list for the size 1 sections 870a is updated, the first section of the linked list identified by the size 1 head pointer register 890a (see arrows 801).

Figure 8C:
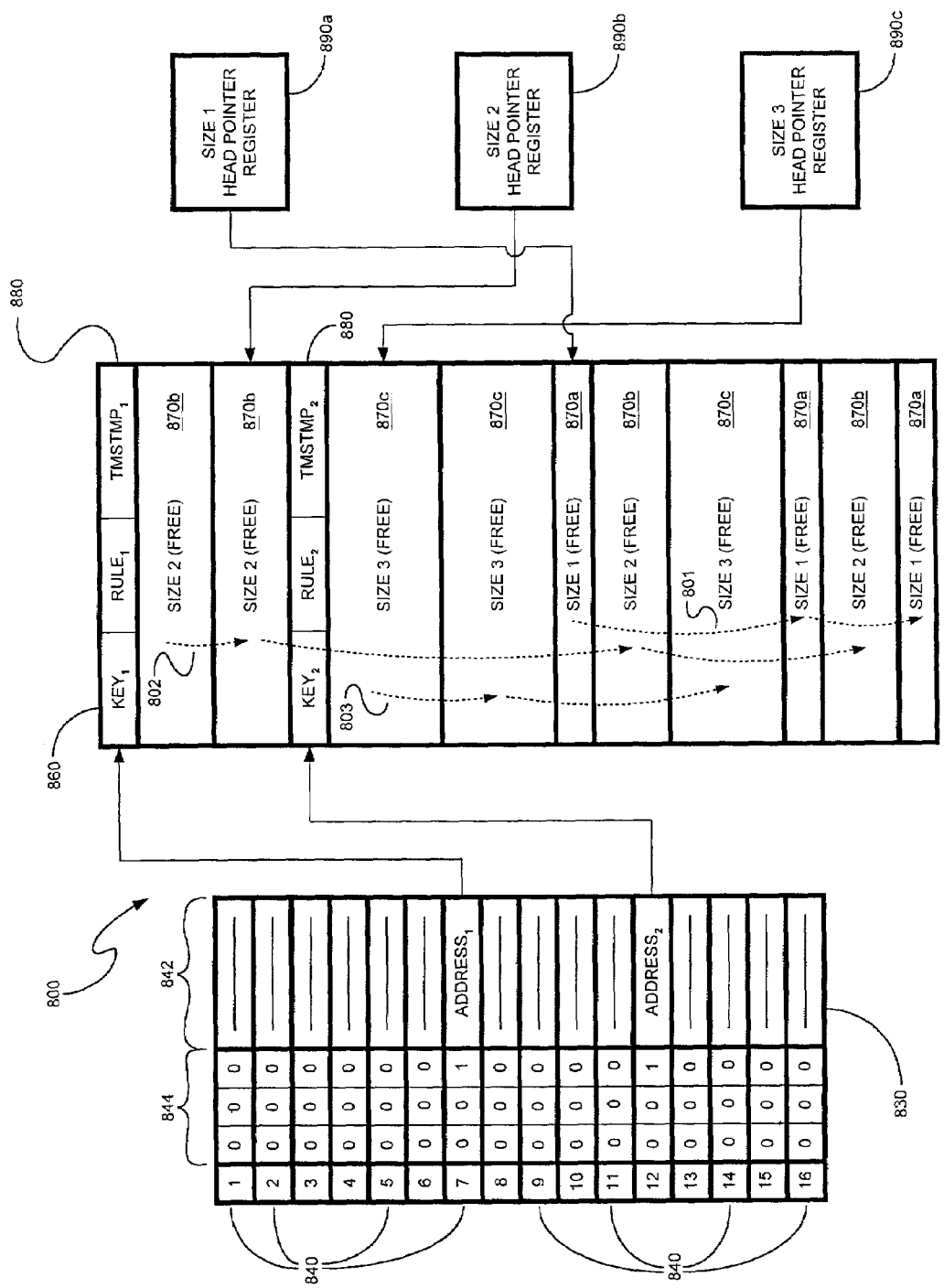

Referring to FIG. 8C in conjunction with FIG. 8B, another data insertion operation is illustrated. Another packet is received and a key (i.e., KEY$_2$) is generated, this key having a 4-bit hash value numerically equal to twelve. Assuming a look-up for this key has failed—i.e., no valid bits set high or no matching entries—the first free size 1 section 870a is identified and allocated to the 12$^{th}$ entry 840 of the index table 830. The address contained in the size 1 head pointer register 890a (i.e., ADDRESS$_2$) is copied over to the section pointer 842 of the 12$^{th}$ entry 840 of the index table 830, such that the size 1 section 870a identified by this address is allocated to the 12$^{th}$ entry 840. A data entry 880 is placed in the newly allocated section 870a, the data entry 880 including the generated key (i.e., KEY$_2$), a corresponding rule (i.e., RULE$_2$), and, optionally, a timestamp (i.e., TMSTMP$_2$). The size 1 head pointer register 890a is updated (by copying over the link pointer from the newly allocated size 1 section 870a) to identify the next available size 1 section, and the valid bits 844 of the 12$^{th}$ entry 840 of index table 830 are updated—i.e., one of these valid bits is set high. Also, as shown by arrows 801, the linked list for the size 1 sections 870a is updated.

Figure 8D:
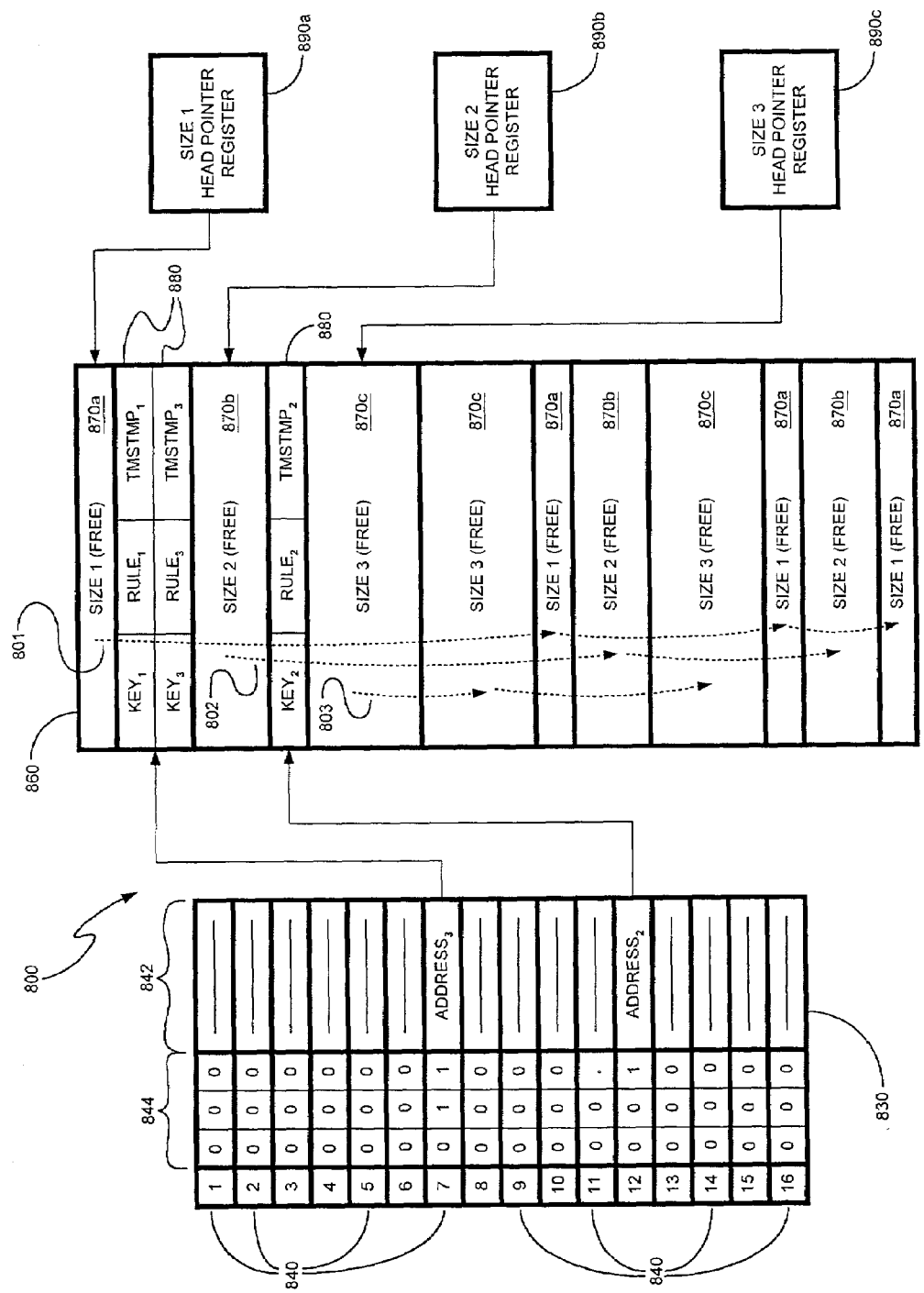

A further look-up and subsequent data insertion operation is illustrated in FIG. 8D in conjunction with FIG. 8C. An additional packet is received and a key (i.e., KEY$_3$) generated based upon the data contained in that packet. A 4-bit hash value is then created by applying the hash function to this key, the 4-bit hash value having a numerical value of seven. The 7$^{th}$ entry 840 of the index table 830 is accessed and the valid bits 844 read. One of the 7$^{th}$ entry's valid bits 844 is set high, indicating a size 1 section 870a of the key database 860 is allocated thereto. The allocated section 870a—having an address of ADDRESS$_1$—is identified by the section pointer 842 in the 7$^{th}$ entry 840 of the index table 830 (see FIG. 8C). Each entry in the section 870a corresponding to ADDRESS$_1$ is compared against the generated key (i.e., KEY$_3$); however, because KEY$_1$ does not match KEY$_3$, the look-up will fail.

As the look-up for KEY$_3$ has failed, a corresponding entry 880—including KEY$_3$, a corresponding rule (i.e., RULE$_3$), and, optionally, a timestamp (i.e., TMSTMP$_3$)—will be inserted into the key database 860. A section of the key database 860 must be allocated to receive this new entry, as well as to receive all other entries including a key having a 4-bit hash value numerically equal to seven. The first free size 2 section 870b is, therefore, allocated to the 7$^{th}$ entry 840 of the index table 830, and the address (i.e., ADDRESS$_3$) contained in the size 2 head pointer register 890b is copied over to the section pointer 842 of the 7$^{th}$ entry 840 in the index table 830. The new entry 880 (i.e., KEY$_3$, RULE$_3$, TMSTMP$_3$) is inserted into this newly allocated section 870b, and the entry 880 (i.e., KEY$_1$, RULE$_1$, TMSTMP$_1$) contained in the previously allocated section 870a is copied over to the newly allocated section (see FIG. 8D). Because a size 2 section 870b is now allocated to the 7$^{th}$ entry 840 of the index table 830, two valid bits 844 in this entry 840 are set high. Also, the head pointer registers are updated. The size 2 head pointer register 890b is updated to contain the address of the next available size 2 section 870b and, in this instance, the size 1 head pointer register 890a is updated to contain the address (i.e., ADDRESS$_1$) of the recently released size 1 section 870a. Further, the linked list for the size 2 sections 870b is updated, wherein the first size 2 section 870b in the linked list is identified by the size 2 head pointer register 890b (see arrows 802).

Figure 8E:
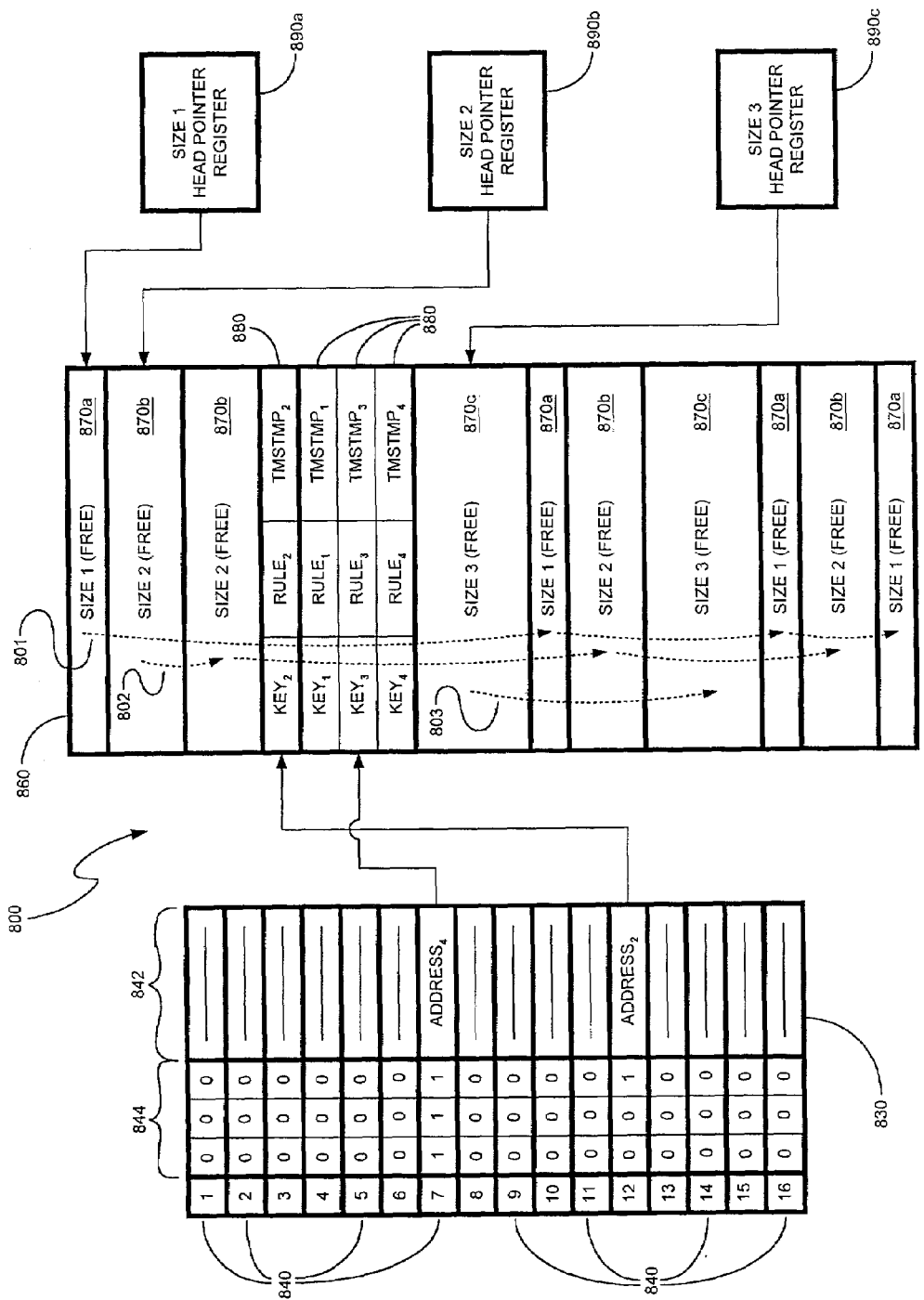

Referring now to FIG. 8E in conjunction with FIG. 8D, another packet is received and a key (i.e., KEY$_4$) generated, this key also having a 4-bit hash value numerically equal to seven. Because KEY$_4$ does not match KEY$_1$ or KEY$_3$, a look-up at the 7$^{th}$ entry 840 of the index table 830 will fail; thus, a new entry—including KEY$_4$, a corresponding rule (i.e., RULE$_4$), and, optionally, a timestamp (TMSTMP$_4$)—will be inserted into the key database 860. A larger size section of the key database 860 needs to be allocated to the 7$^{th}$ entry 840 of the index table 830, the 7$^{th}$ entry 840 containing all keys having an n-bit hash value numerically equal to seven, which will now number three. Accordingly, the address (i.e., ADDRESS$_4$) contained in the size 3 head pointer register 890c is copied over to the section pointer 842 in the 7$^{th}$ entry 840 of the index table 830. The new entry (i.e., KEY$_4$, RULE$_4$, TMSTMP$_4$) is inserted into the newly allocated size 3 section 870c, and the each entry 880 (i.e., KEY$_1$, RULE$_1$, TMSTMP$_1$; and KEY$_3$, RULE$_3$, TMSTMP$_3$) in the previously allocated size 2 section 870b is copied over to the newly allocated section, as illustrated in FIG. 8E. All three valid bits 844 in the 7$^{th}$ entry 840 of the index table 830 are now set high. The size 3 head pointer register 890c is also updated to contain the address of the next available size 3 section 870c and, in this instance, the size 2 head pointer register 890b is updated to contain the address (i.e., ADDRESS$_3$) of the recently released size 2 section 870b. Further, the linked list for the size 3 sections 870c is updated (see arrows 803).

Figure 8F:
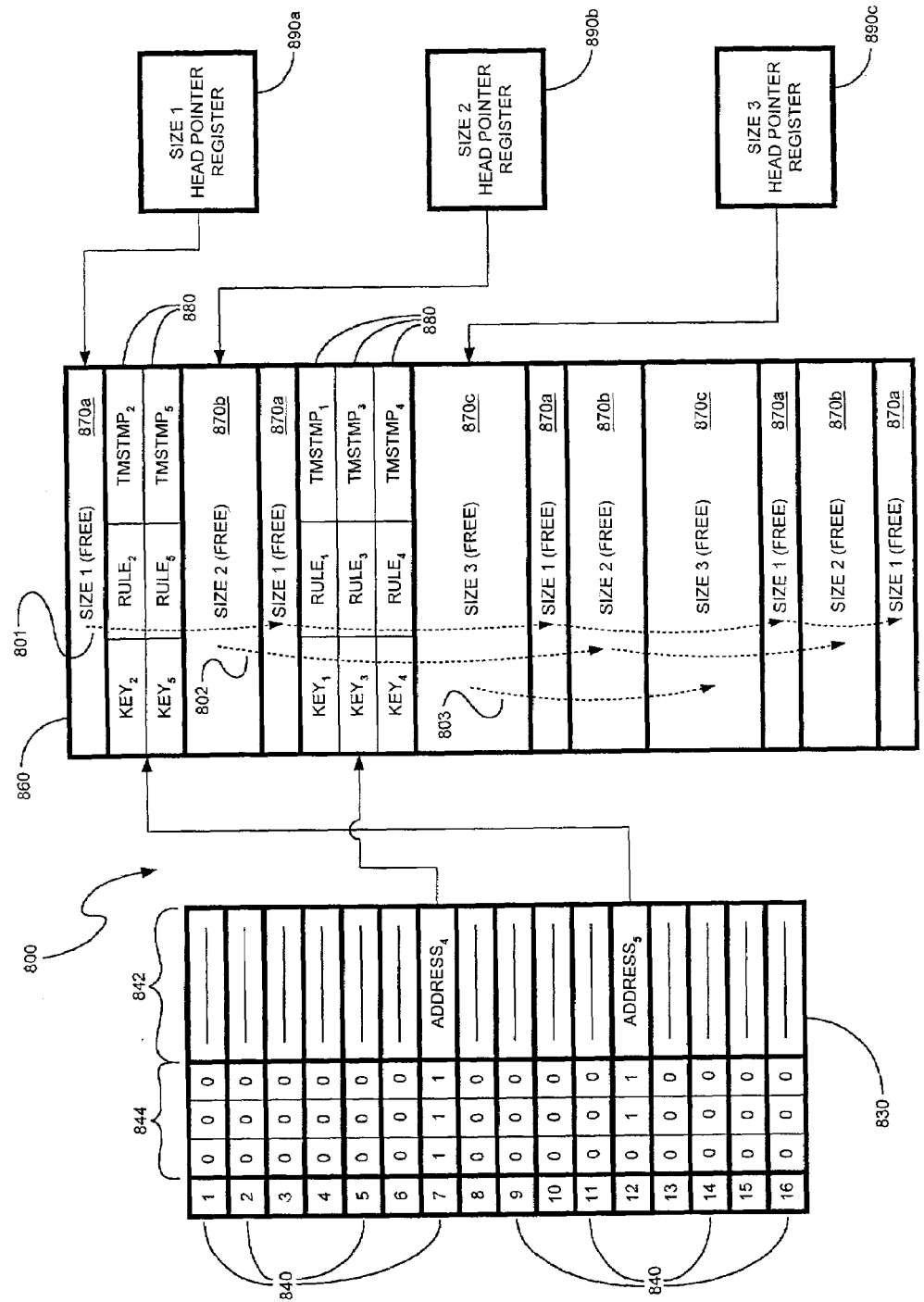
Figure 8G:
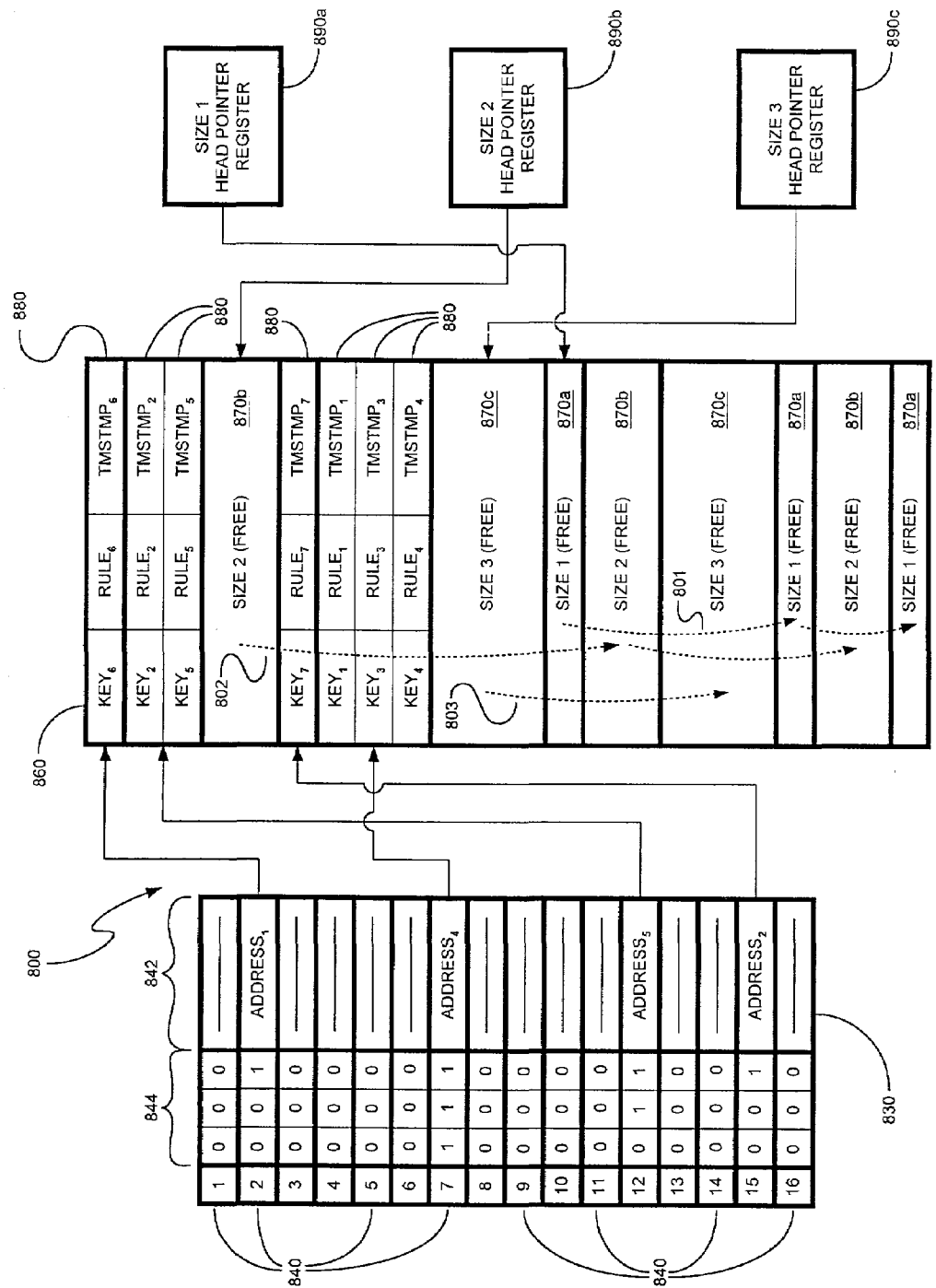
Figure 8H:
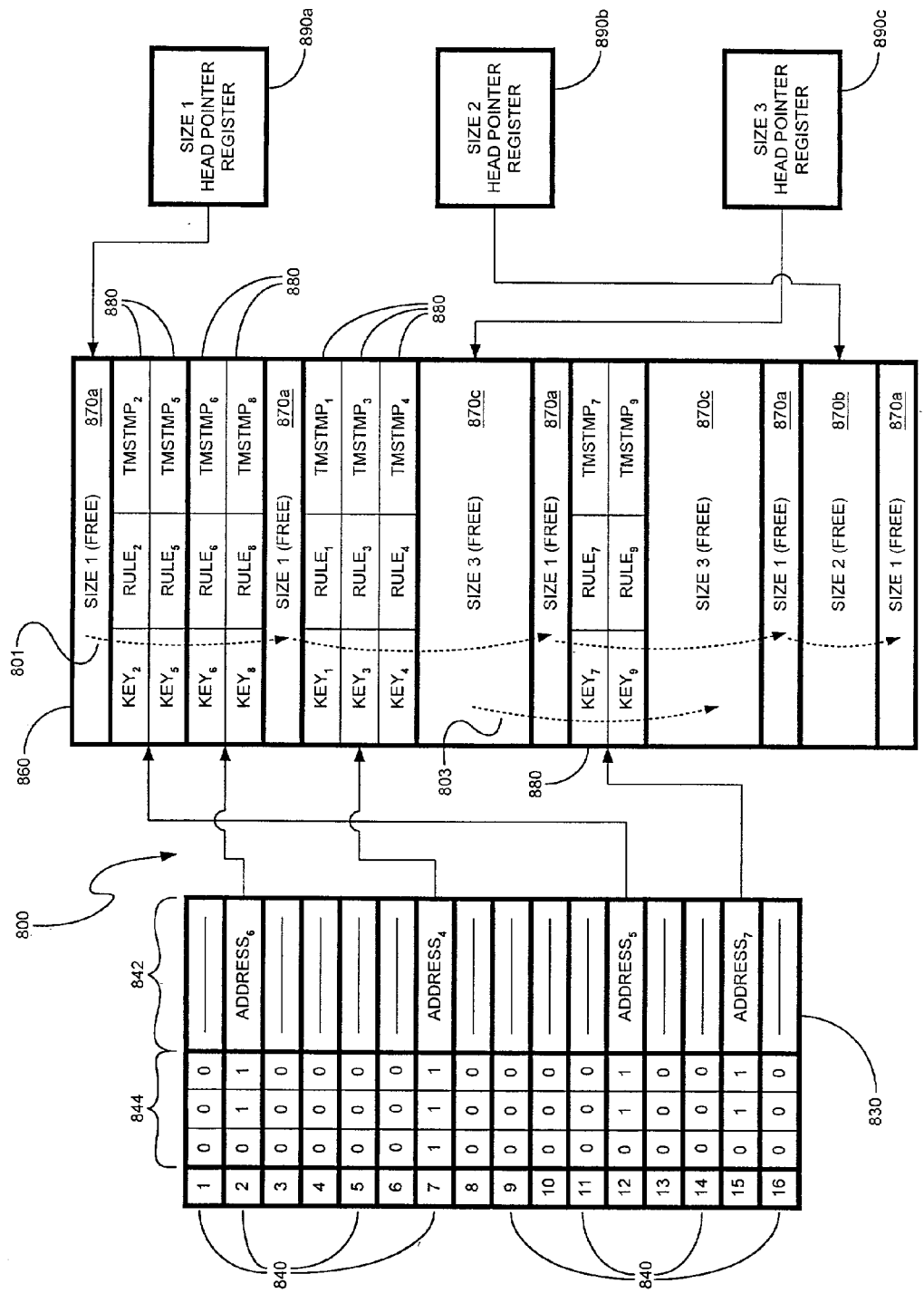

FIGS. 8F through 8H illustrate the state of data structure 800 after the insertion of additional data entries 880 into the key database 860. In FIG. 8F, a fifth entry 880 (i.e., KEY$_5$, RULE$_5$, TMSTMP$_5$) has been inserted into the key database 860. The 4-bit hash value of the inserted key (i.e., KEY$_5$) was numerically equal to twelve; thus, a larger size section—i.e., a size 2 section 870b having an address (i.e., ADDRESS$_5$) copied over from the size 2 head pointer register 890b and into the section pointer 842 of the 12$^{th}$ entry 840 of the index table 830—was allocated to the 12$^{th}$ entry 840 of the index table 830. The valid bits 844 of the index table's 12$^{th}$ entry 840 were updated, such that two valid bits are set high. The head pointer registers, as well as the linked list for the size 2 sections 870b (see arrows 802), were also updated in the same manner as described above.

In FIG. 8G, two more entries 880 have been inserted into the key database 860. One of the entries (i.e., KEY$_6$, RULE$_6$, TMSTMP$_6$) includes a key (i.e., KEY$_6$) having a 4-bit hash value numerically equal to two. Accordingly, a size 1 section 870a is allocated to the 2$^{nd}$ entry 840 of the index table 830, and the address (i.e., ADDRESS$_1$) contained in the size 1 head pointer register 890a is copied over to the section pointer 842 of the index table's 2$^{nd}$ entry 840, which now also has one valid bit 844 set high. The other of the new entries (i.e., KEY$_7$, RULE$_7$, TMSTMP$_7$) includes a key (i.e., KEY$_7$) having a 4-bit hash value numerically equal to fifteen. Thus, another size 1 section 870a of key database 860 is allocated to the 15$^{th}$ entry 840 of the index table 830, and the address (i.e., ADDRESS$_2$) contained in the size 1 head pointer register 890*a*—which was updated after allocating a size 1 section 870*a* to the index table's $2^{nd}$ entry—is copied over to the section pointer 842 of the index table's $15^{th}$ entry 840, this entry now also having one valid bit 844 set high.

In FIG. 8H, two additional entries have been placed in the key database 860. One of the entries (i.e., $KEY_8$, $RULE_8$, $TMSTMP_8$) includes a key (i.e., $KEY_8$) having a 4-bit hash value numerically equal to two (i.e., equivalent to the 4-bit hash of $KEY_6$). Thus, a larger size section—i.e., a size 2 section 870*b* having an address (i.e., $ADDRESS_6$) copied over from the size 2 head pointer register 890*b* and into the section pointer 842 of the index table's $2^{nd}$ entry 840—was allocated to the $2^{nd}$ entry 840 of the index table 830, and two valid bits of this entry are now set high. The other entry (i.e., $KEY_9$, $RULE_9$, $TMSTMP_9$) includes a key (i.e., $KEY_9$) having a 4-bit hash value numerically equal to fifteen (i.e., equivalent to the 4-bit hash of $KEY_7$). Accordingly, a larger size section—i.e., a size 2 section 870*b* having an address (i.e., $ADDRESS_7$) copied over from the size 2 head pointer register 890*b* (which was updated after allocating a size 2 section 870*b* to the index table's $2^{nd}$ entry) and into the section pointer 842 of the index table's $15^{th}$ entry 840—was allocated to the $15^{th}$ entry 840 of the index table 830. Also, two valid bits 844 in the index table's $15^{th}$ entry 840 are now set high. After insertion of the above-described new entries 880, the head pointer registers 890*a–c* have been updated to identify the first free section of their respective sizes. Further, in FIGS. 8F through 8H, the linked lists for all sizes of sections 870*a–c*, respectively, have been maintained (see arrows 801, 802, 803).

A further example of a look-up operation will be described with respect to FIG. 8H. A packet is received and a key generated based upon the data contained in that packet. The generated key is equal to $KEY_3$ and has a corresponding 4-bit hash value numerically equal to seven. Accordingly, the $7^{th}$ entry 840 of the index table 830 is accessed and the valid bits 844 read. Three valid bits 844 are set high, indicating that a size 3 section 870*c* is currently allocated to the index table's $7^{th}$ entry 840. Based upon the address (i.e., $ADDRESS_4$) contained in the section pointer 842 of the $7^{th}$ entry 840, the corresponding size 3 section 870*c* is accessed. Each entry 880 in the allocated size 3 section 870*c* is compared against the newly generated key (i.e., $KEY_3$). An entry 880 of this section includes $KEY_3$; therefore, a match is found and the corresponding rule (i.e., $RULE_3$) may be accessed and applied to the received packet.

It should be noted that although the recently received packet has a key equivalent to $KEY_3$ and a previously received packet—i.e., the packet originally causing insertion of $KEY_3$ into the key database 860—also has a key equal to $KEY_3$, these two packets do not necessarily contain the same data. However, each of these packets is to be subjected to the same rule (e.g., a decision to route the two packets to the same IP address and/or port number). Also, the allocated size 3 section 870*c* contains three entries 880 and, therefore, three keys (i.e., $KEY_1$, $KEY_3$, $KEY_4$) but, as previously noted, it should be understood that these keys are not identical. Rather, each of these three keys contained in the size 3 section 870*c* allocated to the index table's $7^{th}$ entry 840 simply share the same 4-bit hash value (numerically equal to seven). In other words, for the purpose of indexing into and searching the key database 860, these three keys (i.e., $KEY_1$, $KEY_3$, $KEY_4$) have been placed in the same category (i.e., those keys having a 4-bit hash value of seven).

Embodiments of a data structure 500, 800 and embodiments of a device 200 incorporating the same—as well as methods 600, 700 for performing data search and insertion—having been herein described, those of skill in the art will appreciate the advantages thereof. Because a parallel search of a large number of data entries will not be necessary—i.e., when a key is generated and an n-bit hash value formed, the data entries of the key database that are compared with the generated key comprises only those entries that are stored in the section of the key database that has been allocated to the index table entry corresponding to the n-bit hash value of the generated key—the data structure 500, 800 does not require complex and expensive logic circuitry. Further, as the size of the section allocated to an entry of the index table can dynamically change to meet any need for additional storage capacity, data collisions are minimized or eliminated. Also, the data structure 500, 800 is easily expandable—e.g., as by increasing the size of the index table and/or by increasing the size of the key database (both the number of sizes of sections and the number of sections within each size)—to meet the needs of next generation components that may require a database providing a capacity for greater than one million entries.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of these embodiments and the scope of the appended claims.

What is claimed is:

1. A device comprising:
a key generation unit, the key generation unit to access data in a received packet and generate a key containing at least a portion of the data;
a hashing unit, the hashing unit to receive a key from the key generation unit and apply a hashing function to the received key to create an n-bit hash value;
a first memory to store a key database, the key database including a number of sizes of sections, each of the sections to store at least one data entry, wherein each of the data entries within a section includes a key having the same hash value;
a number of head pointer registers, the number of head pointer registers equal to the number of sizes, each of the number of head pointer registers to identify a first free section of one of the sizes of sections; and
a second memory coupled with the first memory and the hashing unit, the second memory to store an index table, the index table including a number of entries, each of the entries corresponding to one n-bit hash value, said each entry including a number of valid bits to indicate allocation of one of the sections of the key database and a section pointer to identify a location in the first memory of the allocated section.

2. The device of claim 1, wherein the number of valid bits in said each entry of the index table equals the number of sizes of sections in the key database.

3. The device of claim 2, a number of the valid bits set high to indicate a size of the allocated section.

4. The device of claim 1, wherein the number of valid bits in said each entry of the index table equals one.

5. The device of claim 1, wherein the number of entries in the index table is equal to $2^n$.

6. The device of claim 1, wherein the at least one data entry includes a key and a rule.

7. The device of claim 6, wherein the at least one data entry further includes a timestamp.

8. The device of claim 1, the first memory and the second memory comprising a single integrated memory.

9. The device of claim 8, wherein the single integrated memory comprises a random access memory.

10. The device of claim 8, wherein the single integrated memory comprises an external memory.

11. The device of claim 8, wherein the key generation unit, the hashing unit, the single integrated memory, and the head pointer registers form at least part of a single integrated circuit device.

12. The device of claim 1, each of the first memory and the second memory comprising random access memory.

13. The device of claim 1, wherein at least one of the first memory and the second memory comprises an external memory.

14. The device of claim 1, wherein the key generation unit, the hashing unit, the first memory, the head pointer registers, and the second memory form at least part of a single integrated circuit device.

15. A method comprising:
  storing a number of data entries in a first section of a key database, the first section allocated to one of a plurality of entries of an index table responsive to a hash function applied to a key, a size of the first section corresponding to the number of data entries, each of the data entries of the first section including a key having a same hash value;
  receiving a data entry including a key;
  generating the hash value by applying a hash function to the received key;
  allocating a second section of the key database to the one entry of the index table responsive to the hash value, a size of the second section greater than the size of the first section.

16. The method of claim 15, further comprising inserting the received data entry into the second section.

17. The method of claim 15, further comprising copying the number of data entries from the first section over to the second section.

18. The method of claim 15, further comprising updating a section pointer in the one entry of the index table to include a memory address of the second section.

19. A method comprising:
  accessing an entry of an index table, the accessed entry corresponding to a hash value;
  reading a valid bit in the corresponding entry of the index table; and
  if the valid bit is set low,
    finding a first free section of a smallest available size in a key data base having a number of sizes of sections,
    allocating the first free section of the smallest available size to the corresponding entry of the index table, and
    inserting a data entry into the allocated first free section of the smallest available size, wherein the data entry includes a key having the hash value.

20. The method of claim 19, wherein the smallest available size corresponds to a size capable of storing a single data entry.

21. The method of claim 19, wherein the inserted data entry includes a key and a rule.

22. The method of claim 21, wherein the inserted data entry further includes a timestamp.

23. The method of claim 19, further comprising setting the valid bit high.

24. The method of claim 19, further comprising updating a section pointer in the corresponding entry of the index table to include a memory address of the allocated first free section of the smallest available size.

25. The method of claim 19, further comprising updating a head pointer register corresponding to the smallest available size to include a memory address of another free section of the smallest available size.

26. The method of claim 19, further comprising:
  if the valid bit is set high,
    reading a section pointer in the corresponding entry of the index table to determine a memory address of a section of the key database previously allocated to the corresponding entry of the index table,
    determining a size of the previously allocated section,
    finding a first free section in the key database of a size greater than the size of the previously allocated section,
    allocating the first free section of the greater size to the corresponding entry of the index table, and
    inserting the data entry into the first free section of the greater size.

27. The method of claim 26, further comprising copying a data entry from the previously allocated section over to the allocated first free section of the greater size, wherein each data entry within the first free section includes a key having the same hash value.

28. The method of claim 26, further comprising updating the section pointer to include a memory address of the allocated first free section of the greater size.

29. The method of claim 26, further comprising updating a head pointer register corresponding to the greater size to include a memory address of another free section of the greater size.

30. The method of claim 26, further comprising determining the size of the previously allocated section by determining a number of valid bits set high in the corresponding entry of the index table, the number of high valid bits indicating the size of the previously allocated section.

31. A method comprising:
  accessing an entry in an index table, the accessed entry corresponding to a hash value;
  reading a plurality of valid bits from the corresponding entry of the index table;
  determining a number of the plurality of valid bits set high;
  finding in a key database a first free section of a size equal to one more than the number of high valid bits, the key database having sections of a number of sizes, each section for storing data entries, wherein each data entry within a section includes a key having the same hash value;
  allocating the first free section of a size one more than the number of high valid bits to the corresponding entry of the index table; and
  inserting a data entry into the allocated section of the key database.

32. The method of claim 31, further comprising:
  updating a section pointer in the corresponding entry of the index table to include a memory address of the first free section of a size equal to one more than the number of high valid bits; and
  setting one bit high of the plurality of valid bits in the corresponding entry of the index table.

33. The method of claim 31, further comprising updating a head pointer register corresponding to the size equal to one more than the number of high valid bits to include a memory address of another free section of the size equal to one more than the number of high valid bits.

34. The method of claim 31, wherein the inserted data entry includes a key and a rule.

35. The method of claim 34, wherein the inserted data entry further includes a timestamp.

36. The method of claim 31, wherein the number of valid bits set high is at least one, the method further comprising:
  accessing the section pointer in the corresponding entry of the index table, the section pointer including a memory address of a section in the key database of a size equal to the number of high valid bits;
  copying a data entry from the section of a size equal to the number of high valid bits over to the allocated section of a size equal to one more than the number of high valid bits.

37. The method of claim 36, further comprising updating a head pointer register corresponding to the size equal to the number of high valid bits to include the memory address.

38. A data structure comprising:
  an index table for storing a plurality of entries, each of the entries corresponding to one of a plurality of hash values, each entry including a section pointer to identify a memory address of one of a plurality of sections of a key database and each entry including valid bits to indicate a size of the respective section of the key database,
  wherein the key database is for storing a plurality of data entries, each data entry including a search key having one of the plurality of hash values, the data entries grouped into the plurality of sections, each section for storing data entries with search keys having the same hash value.

39. The data structure of claim 38, wherein the number of valid bits corresponds to a number of sizes of sections in the key database.

40. The data structure of claim 38, wherein each entry in the index table corresponds to a respective hash value of an n-bit hash function.

41. The data structure of claim 40, wherein the number of entries in the index table is equal to $2^n$, where n is the number of bits of the n-bit hash function.

42. The data structure of claim 38, wherein at least one of the data entries of the key database further includes a rule.

43. The data structure of claim 38, wherein at least one of the data entries of the key database further includes a timestamp.

44. The data structure of claim 38, wherein the key database is stored in a first memory and the index table is stored in a second memory.

45. The data structure of claim 38, wherein the key database and the index table are stored in a single memory.

46. The data structure of claim 38, wherein each of the key database and the index table are stored in a random access memory.

47. A method comprising:
  receiving a data packet;
  generating a search key based on the received data packet;
  generating a hash value by applying a hash function to the generated search key;
  accessing an entry in an index table, the entry corresponding to the generated hash value, wherein the entry includes a valid bit and a section pointer, the valid bit for indicating a size of a first section of a key database, the section pointer for identifying the location of the first section;
  searching the first section of the key database identified by the section pointer for a search key corresponding to the generated search key;
  if the first section of the key database identified by the section pointer does not contain a search key that corresponds to the generated search key,
    allocating a second section of the key database, wherein the second section has a size greater than the size of the first section;
    inserting the generated search key in the second section of the key database;
    moving each search key of the first section to the second section of the key database.

48. The method of claim 47, further comprising updating the valid bit of the entry of the index table corresponding to the generated hash value, wherein the updated valid bit is for indicating the size of the allocated second section.

49. The method of claim 47, further comprising updating the section pointer of the entry of the index table corresponding to the generated hash value, wherein the updated section pointer is for indicating the location of the allocated second section.

50. The method of claim 47, wherein each section of the key database includes a number of search keys corresponding to a size indicated by a respective valid bit in the index table.

* * * * *